United States Patent
Guan et al.

(10) Patent No.: US 12,531,680 B2
(45) Date of Patent: Jan. 20, 2026

(54) SIGNAL TRANSMISSION METHOD AND COMMUNICATIONS APPARATUS

(71) Applicant: HUAWEI TECHNOLOGIES CO., LTD., Guangdong (CN)

(72) Inventors: Peng Guan, Shenzhen (CN); Xi Zhang, Ottawa (CA); Lei Chen, Chengdu (CN); Xuyun Fan, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 579 days.

(21) Appl. No.: 17/150,039

(22) Filed: Jan. 15, 2021

(65) Prior Publication Data
US 2021/0135821 A1 May 6, 2021

Related U.S. Application Data

(63) Continuation of application No. PCT/CN2019/099747, filed on Aug. 8, 2019.

(30) Foreign Application Priority Data

Aug. 17, 2018 (CN) .......................... 201810943486.0

(51) Int. Cl.
*H04L 5/00* (2006.01)
*H04B 7/06* (2006.01)

(52) U.S. Cl.
CPC ....... *H04L 5/0048* (2013.01); *H04B 7/06968* (2023.05)

(58) Field of Classification Search
CPC ......... H04W 52/0219; H04W 52/0229; H04W 52/0216; H04W 52/028; H04W 48/16;
(Continued)

(56) References Cited

U.S. PATENT DOCUMENTS

2018/0220403 A1 8/2018 John Wilson et al.
2019/0058517 A1* 2/2019 Kang ..................... H04L 5/005
(Continued)

FOREIGN PATENT DOCUMENTS

CN 108092754 A 5/2018
CN 108199819 A 6/2018
(Continued)

OTHER PUBLICATIONS

Office Action issued in Japanese Application No. 2021-507753 on Apr. 12, 2022, 4 pages (with English translation).
(Continued)

*Primary Examiner* — Jean A Gelin
(74) *Attorney, Agent, or Firm* — Fish & Richardson P.C.

(57) ABSTRACT

This application provides example signal transmission methods and communications apparatuses. One example method includes receiving first configuration information, where the first configuration information includes at least one transmission configuration indicator (TCI) state and a configuration of a tracking reference signal (TRS) of a first channel, and the TRS is a set including a plurality of channel state information reference signal (CSI-RS) resources. A quasi-colocation (QCL) parameter of the first channel is determined based on one or more of a first CSI-RS resource in a plurality of CSI-RS resources included in a first TRS in the TRS, a first TC state in the at least one TCI state, and a synchronization signal and PBCH block (SSB). The first channel is then received on the QCL parameter of the first channel.

20 Claims, 18 Drawing Sheets

(58) Field of Classification Search
CPC . H04W 68/005; H04W 72/23; H04W 72/046; H04L 5/0051; H04L 5/0048; H04L 5/005; H04L 5/0007; H04L 5/001; H04L 5/0091; H04B 7/06968; H04B 7/0617; H04B 7/086; H04B 7/088
USPC .......................................................... 370/329
See application file for complete search history.

(56) References Cited

U.S. PATENT DOCUMENTS

| | | | | |
|---|---|---|---|---|
| 2019/0141691 | A1* | 5/2019 | Kwon | H04L 5/00 |
| 2019/0239093 | A1* | 8/2019 | Zhang | H04L 5/001 |
| 2019/0281587 | A1* | 9/2019 | Zhang | H04W 72/23 |
| 2019/0296956 | A1* | 9/2019 | John Wilson et al. | H04L 25/0224 |
| 2019/0297637 | A1* | 9/2019 | Liou | H04W 72/1273 |
| 2019/0305830 | A1* | 10/2019 | Zhou | H04B 7/0697 |
| 2019/0349061 | A1* | 11/2019 | Cirik | H04L 1/1861 |
| 2019/0349964 | A1* | 11/2019 | Liou | H04B 7/0626 |
| 2019/0373450 | A1* | 12/2019 | Zhou | H04W 76/27 |
| 2020/0052813 | A1* | 2/2020 | Hosseini | H04L 1/0067 |
| 2020/0053757 | A1* | 2/2020 | Bagheri | H04L 5/0058 |
| 2020/0059874 | A1* | 2/2020 | Noh | H04L 5/0051 |
| 2020/0120584 | A1* | 4/2020 | Yi | H04L 5/0048 |
| 2020/0178239 | A1* | 6/2020 | Yi | H04L 5/0055 |
| 2020/0212983 | A1* | 7/2020 | Cha | H04B 7/06 |
| 2020/0288479 | A1* | 9/2020 | Xi | H04B 7/088 |
| 2020/0337058 | A1* | 10/2020 | Song | H04L 5/10 |
| 2020/0389883 | A1* | 12/2020 | Faxér | H04L 5/0053 |
| 2021/0050936 | A1* | 2/2021 | Seo | H04W 72/20 |
| 2021/0168030 | A1* | 6/2021 | Li | H04W 72/23 |
| 2021/0185709 | A1* | 6/2021 | Takeda | H04B 7/022 |
| 2021/0258200 | A1* | 8/2021 | Lee | H04L 5/0051 |
| 2021/0306996 | A1* | 9/2021 | Matsumura | H04W 72/20 |
| 2021/0307076 | A1* | 9/2021 | Matsumura | H04W 74/0833 |
| 2021/0314038 | A1* | 10/2021 | Matsumura | H04L 25/0202 |
| 2021/0314218 | A1* | 10/2021 | Kang | H04B 7/088 |
| 2021/0314938 | A1* | 10/2021 | Kim | H04W 76/10 |
| 2021/0314954 | A1* | 10/2021 | Miao | H04L 1/1896 |
| 2022/0052808 | A1* | 2/2022 | Shrivastava | H04L 5/0048 |
| 2023/0083208 | A1* | 3/2023 | Zhang | H04B 7/0695 370/329 |
| 2023/0164865 | A1* | 5/2023 | Kang | H04B 7/0408 370/329 |
| 2023/0208490 | A1* | 6/2023 | Kim | H04B 7/0626 370/329 |
| 2023/0379910 | A1* | 11/2023 | Lee | H04L 5/005 |

FOREIGN PATENT DOCUMENTS

| | | |
|---|---|---|
| CN | 108260214 A | 7/2018 |
| EP | 3567967 A1 | 11/2019 |
| EP | 3637669 A1 | 4/2020 |
| JP | 2020533896 A | 11/2020 |
| JP | 2021519551 A | 8/2021 |

OTHER PUBLICATIONS

Qualcomm Incorporated, "Maintenance on Reference Signals and QCL," 3GPP TSG RAN WG1 Meeting #94, R1-1809504, Gothenburg, Sweden, Aug. 20-24, 2018, 26 pages.

Qualcomm Incorporated, "Beam management for NR," 3GPP TSG-RAN WG1 Meeting #94, R1- 1809423, Gothenburg, Sweden, Aug. 20-24, 2018, 15 pages.

3GPP TS 38.331 V15.2.1 (Jun. 2018); 3rd Generation Partnership Project; Technical Specification Group Radio Access Network; NR; Radio Resource Control (RRC) protocol specification (Release 15); total 303 pages.

Ericsson, "Remaining issues for beam recovery," 3GPP TSG-RAN WG1 Meeting #93, R1-1806218, Busan, Korea, May 21-25, 2018, 5 pages.

3GPP TS 38.321 V15.2.0 (Jun. 2018), "3rd Generation Partnership Project; Technical Specification Group Radio Access Network; NR; Medium Access Control (MAC) protocol specification (Release 15)," Jun. 2018, 73 pages.

3GPP TS 38.213 V15.2.0 (Jun. 2018), "3rd Generation Partnership Project; Technical Specification Group Radio Access Network; NR; Physical layer procedures for control (Release 15)," Jun. 2018, 99 pages.

3GPP TS 38.211 V15.2.0 (Jun. 2018), "3rd Generation Partnership Project; Technical Specification Group Radio Access Network; NR; Physical channels and modulation (Release 15)," Jun. 2018, 96 pages.

3GPP TS 38.331 V15.2.0 (Jun. 2018), "3rd Generation Partnership Project; Technical Specification Group Radio Access Network; NR; Radio Resource Control (RRC) protocol specification (Release 15)," Jun. 2018, 304 pages.

3GPP TS 38.214 V15.2.0 (Jun. 2018), "3rd Generation Partnership Project; Technical Specification Group Radio Access Network; NR; Physical layer procedures for data (Release 15)," Jun. 2018, 94 pages.

3GPP TS 38.212 V15.2.0 (Jun. 2018), "3rd Generation Partnership Project; Technical Specification Group Radio Access Network; NR; Multiplexing and channel coding (Release 15)," Jun. 2018, 98 pages.

PCT International Search Report and Written Opinion in International Application No. PCT/CN2019/099747, dated Oct. 28, 2019, 13 pages.

Ericsson, "On beam indication, measurement, and reporting," 3GPP TSG-RAN WG1 NR Ad Hoc #3, R1-1716350, Nagoya, Japan, Sep. 18-21, 2017, 13 pages.

Ericsson, "The QCL framework in NR," 3GPP TSG-RAN WG1 #89ah-NR, R1-1711051, Qingdao, China, Jun. 27-30, 2017, 6 pages.

Office Action issued in Chinese Application No. 201810943486.0 on Aug. 2, 2021, 12 pages.

CHTTL, "Discussion on remaining issues beam management," 3GPP TSG RAN WG1 Meeting #93, R1-1807126, Busan, Korea, May 21-25, 2018, 5 pages.

Extended European Search Report issued in European Application No. 19850667.7 on Jul. 9, 2021, 14 pages.

Intel Corporation, "Corrections to QCL for NR," 3GPP TSG RAN WG1 Meeting AH 1801, R1-1800320, Vancouver, Canada, Jan. 22-26, 2018, 5 pages.

Spreadtrum Communications, "Remaining issues on PDCCH," 3GPP TSG RAN WG1 Meeting #94, R1-1808796, Gothenburg, Sweden, Aug. 20-24, 2018, 11 pages.

VIVO, "Remaining issues on beam measurement and reporting," 3GPP TSG RAN WG1 Meeting #94, R1-1808221, Gothenburg, Sweden, Aug. 20-24, 2018, 7 pages.

Huawei, HiSilicon, "Beam Measurement, Reporting and Indication," 3GPP TSG RAN WG1 Meeting #91, R1- 1719422, Reno, USA, Nov. 27-Dec. 1, 2017, 11 pages.

* cited by examiner

| R | Serving cell ID | | | | | BWP ID | | Oct 1 |
|---|---|---|---|---|---|---|---|---|
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2)*8+7}$ | $T_{(N-2)*8+6}$ | $T_{(N-2)*8+5}$ | $T_{(N-2)*8+4}$ | $T_{(N-2)*8+3}$ | $T_{(N-2)*8+2}$ | $T_{(N-2)*8+1}$ | $T_{(N-2)*8}$ | Oct N |

FIG. 10

SIGNAL TRANSMISSION METHOD AND COMMUNICATIONS APPARATUS

CROSS-REFERENCE TO RELATED APPLICATIONS

This application is a continuation of International Application No. PCT/CN2019/099747, filed on Aug. 8, 2019, which claims priority to Chinese Patent Application No. 201810943486.0, filed on Aug. 17, 2018. The disclosures of the aforementioned applications are hereby incorporated by reference in their entireties.

TECHNICAL FIELD

This application relates to the communications field, and more specifically, to a signal transmission method and a communications apparatus.

BACKGROUND

Beam-based communication can bring a higher antenna gain. Particularly, in a high-frequency communication environment, the beam-based communication can overcome fast attenuation of a high-frequency signal. A network device and a terminal device may obtain a pairing relationship between a transmit beam and a receive beam through beam training, and the terminal device may determine a receive beam based on the pairing relationship and a transmission configuration indicator (TCI) state dynamically indicated by the network device.

Before the network device explicitly indicates the terminal device to receive a TCI state used by a signal, the network device notifies the terminal device of all available TCI states of the terminal device. The terminal device needs to perform quasi-colocation (QCL) assumption. Through the QCL assumption, the terminal device determines information about a beam that is used to receive the signal before the terminal device receives the TCI state explicitly indicated by the network device, and receives the signal on the beam. However, in a current QCL assumption process of the terminal device, a synchronization signal and PBCH block (SSB) in an initial access process is used as a default QCL reference, that is, a parameter of an antenna port for transmitting the SSB is used to determine a parameter of an antenna port for receiving a signal, to determine a beam used to receive the signal. Consequently, the determined beam for receiving the signal is inaccurate, and signal receiving and demodulation are severely affected.

SUMMARY

This application provides a signal transmission method and a communications apparatus, so that a beam estimation process can be performed by using a more accurate QCL reference. This improves accuracy of QCL assumption, and improves efficiency of signal receiving and demodulation.

According to a first aspect, a signal transmission method is provided. The method provided in the first aspect may be performed by a terminal device, or may be performed by a chip disposed in a terminal device. This is not limited in this application.

Specifically, the method includes: The terminal device receives first configuration information, where the first configuration information includes at least one transmission configuration indicator TCI state and a configuration of a tracking reference signal TRS of a first channel, the TRS is a set including a plurality of channel state information reference signal CSI-RS resources, and a first CSI-RS resource may be any one of a plurality of CSI-RS resources included in a first TRS. Alternatively, the first CSI-RS resource may be a CSI-RS resource with a smallest number or a largest number in the plurality of CSI-RS resources included in the first TRS, and the first configuration information may include configurations of a plurality of TRSs or include a configuration of one TRS. The terminal device receives the TRS. The terminal device determines a quasi-colocation QCL parameter of the first channel based on one or more of the first CSI-RS resource in the plurality of CSI-RS resources included in the first TRS in the TRS, a first TC state in the at least one TCI state, and a synchronization signal and PBCH block SSB, where the QCL parameter of the first channel may include information about a receive beam of the first channel. That the QCL parameter of the first channel is determined means that a first receive beam of the first channel is determined. The terminal device receives the first channel based on the QCL parameter of the first channel. That is, the first channel is received on the first receive beam of the first channel.

According to the signal transmission method provided in the first aspect, in a process in which the terminal device performs QCL assumption before receiving an activation command specific to a plurality of TC states of the first channel, the TRS, the SSB, or the first TC state in the plurality of TCI states may be used as a default QCL reference of the first channel, instead of using only the SSB as the default QCL reference of the first channel. In this way, the terminal device can perform a beam estimation process by using a more accurate QCL reference. This improves accuracy of the QCL assumption, and improves efficiency of receiving and demodulation of the first channel. This further improves communication efficiency and user experience.

In a possible implementation of the first aspect, when the first configuration information is carried in initial radio resource control RRC, it indicates that an interval between a time point at which the first configuration information is received and a time point at which initial access is completed is not very long. Therefore, that the terminal device determines a QCL parameter of the first channel based on one or more of the first CSI-RS resource, a first TC state, and an SSB includes: determining the QCL parameter of the first channel based on the SSB or the first TC state, where the first TC state is a TC state with a smallest TC state number in the at least one TC state, and the SSB is an SSB in an initial access process. In this implementation, the QCL parameter of the first channel is determined based on the SSB in the initial access process or the first TC state, so that a time period of determining the QCL parameter of the first channel can be reduced, and accuracy of the determined QCL parameter of the first channel is also relatively high. This further improves accuracy of receiving the first channel by the terminal device.

In a possible implementation of the first aspect, when the first configuration information is carried in a radio resource control RRC reconfiguration obtained after an initial access process, it indicates that an interval between a time point at which the first configuration information is received and a time point at which initial access is completed is relatively long, where the RRC reconfiguration may be understood as an RRC configuration received after initial RRC after the terminal device initially accesses a network. Therefore, the determining a QCL parameter of the first channel based on one or more of the first CSI-RS resource, a first TCI state, and an SSB includes: determining the QCL parameter of the first channel based on the first CSI-RS resource. In this implementation, when the first configuration information is carried in the RRC reconfiguration, the QCL parameter of the first channel is determined based on the first CSI-RS resource. This can improve accuracy of the determined QCL parameter of the first channel. This further improves accuracy of receiving the first channel by the terminal device.

In a possible implementation of the first aspect, if a random access process has been completed before the first configuration information is received, it indicates that an interval between a time point at which the terminal device performs the QCL assumption and a time point at which random access is completed is not long. Therefore, that the terminal device determines a QCL parameter of the first channel based on one or more of the first CSI-RS resource, a first TCI state, and an SSB includes: determining the QCL parameter of the first channel based on the SSB, where the SSB is an SSB in the random access process. In this implementation, when the random access process has been completed before the first configuration information is received, the QCL parameter of the first channel is determined based on the SSB in the random access process, so that a time period of determining the QCL parameter of the first channel can be reduced, and accuracy of the determined QCL parameter of the first channel is also relatively high. This further improves accuracy of receiving the first channel by the terminal device.

Optionally, a time length X may be predefined in a protocol or notified by a network device. If the terminal device has performed the random access process within a time period of the length X before a time point at which the first configuration information is received, the terminal device may determine the QCL parameter of the first channel based on the SSB and/or a CS-RS used in the random access process. A time unit of the time length X may include but is not limited to a symbol time, a slot, a subframe, a frame, or a millisecond.

In a possible implementation of the first aspect, when a random access process has not been completed before the first configuration information is received, the determining a QCL parameter of the first channel based on one or more of the first CSI-RS resource, a first TCI state, and an SSB includes; determining the QCL parameter of the first channel based on the first CSI-RS resource. In this implementation, when the terminal device has not completed the random access process before receiving the first configuration information, the terminal device determines the QCL parameter of the first channel based on the first CSI-RS resource. This can improve accuracy of the determined QCL parameter of the first channel. This further improves accuracy of receiving the first channel by the terminal device.

Optionally, a time length X may be predefined in a protocol or notified by a network device. If the terminal device has not performed the random access process within a time period of the length X before a time point at which the first configuration information is received, the terminal device determines the QCL parameter of the first channel based on the first CSI-RS resource.

In a possible implementation of the first aspect, when the first configuration information includes configurations of a plurality of TRSs, the first TRS is a TRS with a smallest number of TRSs in the plurality of TRSs; or the first TRS is a TRS, in receiving of the plurality of TRSs, having a shortest time interval from a moment at which a QCL reference of the first channel is determined; or the first TRS is a TRS, in measurement of the plurality of TRSs, having a shortest time interval from a moment at which a QCL reference of the first channel is determined.

In a possible implementation of the first aspect, when the first configuration information includes the configurations of the plurality of TRSs, the method further includes: receiving indication information, where the indication information is used to indicate that one or more of the plurality of TRSs are activated TRSs, and the activated TRSs include the first TRS. In a subsequent process in which the terminal device receives a TRS, the terminal device needs to track only the activated TRS based on the indication information. In this implementation, the terminal device can be prevented from detecting all configured TRSs, resource consumption of the terminal device is reduced, efficiency and accuracy of determining the first TRS by the terminal device are improved, and the communication efficiency is improved.

Optionally, before receiving an activation indication sent by the network device, the terminal device does not need to track the plurality of TRSs configured in the first configuration information.

Optionally, before receiving an activation indication sent by the network device, the terminal device needs to track the plurality of TRSs configured in the first configuration information. After receiving the activation indication, the terminal needs to track only the activated TRS.

Optionally, the indication information may be shown as a bitmap.

In a possible implementation of the first aspect, when the first configuration information includes the configurations of the plurality of TRSs, each of the plurality of TRSs includes a first field, and the first field is used to indicate that the TRS is an activated TRS. This reduces resource consumption of the terminal device, improves efficiency and accuracy of determining the first TRS by the terminal device, and improves the communication efficiency.

Optionally, because the TRS is a CSI-RS resource set, and the CSI-RS resource set includes a trs-Info field, the first field may be 1-bit trs-Info change information. For example, when the first field is 1, it indicates that the CSI-RS resource set is an activated TRS, and when the first field is 0, it indicates that the CSI-RS resource set is an inactivated TRS.

In a possible implementation of the first aspect, the determining the QCL parameter of the first channel based on the first CSI-RS resource includes: determining the QCL parameter of the first channel based on a reference signal resource included in a TCI state corresponding to the first CSI-RS resource.

In a possible implementation of the first aspect, the configuration of the TRS includes information about a component carrier CC or a bandwidth part BWP corresponding to the TRS.

In a possible implementation of the first aspect, the method further includes: receiving an activation command, where the activation command is used to activate a second TCI state in the at least one TCI state; determining the second TCI state based on the activation command; determining a second receive beam of the first channel based on the second TCI state; and receiving the first channel by using the second receive beam of the first channel.

Optionally, the activation command is a MAC-CE.

Optionally, when a TRS is activated, a QCL reference of the activated TRS may also be indicated. Because the TRS is a CSI-RS resource set, when the TRS is activated, a TCT state of each CSI-RS resource in the CSI-RS resource set may be activated by using an indication.

In a possible implementation of the first aspect, the method further includes: determining, based on the second TCI state, an activated second TRS set corresponding to the second TCI state, where the second TRS set is used to determine a QCL parameter of a second channel; receiving second configuration information, where the second configuration information includes at least one TCI state of the second channel determining the QCL parameter of the second channel based on one or more of a third CSI-RS resource in a plurality of CSI-RS resources included in a third TRS, a third TCI state in the at least one TCI state of the second channel, and the SSB, where the second TRS set includes the third TRS; and receiving the second channel based on the QCL parameter of the second channel. In this implementation, when the terminal device needs to receive the second channel, the TRS determined based on the activation command of the TCI state of the first channel may still be used as a QCL reference for receiving the second channel, or the third TCI state in the at least one TCI state of the second channel is used as a QCL reference for receiving the second channel, or the SSB is used as a QCL reference for receiving the second channel. This can improve the accuracy of the QCL assumption, so that the terminal device receives the second channel on a more accurate beam; and improve efficiency of receiving and demodulation of the second channel. Because the TRS previously determined based on the activation command of the TCI state of the first channel is used, the second configuration information may not include configuration information of the TRS, thereby reducing signaling overheads and a waste of resources, and further saving resources. This improves the communication efficiency and the user experience.

Optionally, the terminal device tracks the activated TRS based on the second TCI state activated by using the activation command. In this implementation, a TCI state may not be explicitly configured for the activated TRS, or a TCI state configured for the activated TRS is replaced by an activated TCI state. The TRS is a CSI-RS resource set, that is, a TCI state is not explicitly configured for a CSI-RS resource in the activated CSI-RS resource set, or a TCI state configured for the CSI-RS resource is replaced by an activated TCI state. If eight TCI states are activated, the eight TCI states may be respectively used as QCL references of eight TRSs in a predetermined sequence, for example, in ascending or descending order of TCI numbers.

Optionally, the terminal device may feed back, to the network device, a maximum quantity of activated TCI states and a maximum quantity of activated TRSs that are supported by the terminal device. The maximum quantity of activated TCI states needs to be less than or equal to the maximum quantity of activated TRSs. In this way, it can be ensured that each activated TCI (beam) can have a corresponding TRS for a time-frequency tracking function.

In a possible implementation of the first aspect, the method further includes: The terminal device receives second configuration information, where the second configuration information includes at least one TCI state of a second channel; the terminal device determines a QCL parameter of the second channel based on one or more of a third CSI-RS resource in a plurality of CSI-RS resources included in a third TRS, a third TCI state in the at least one TCI state of the second channel, and the SSB, where a second TRS set includes the third TRS; and the terminal device determines a first receive beam of the second channel based on the QCL parameter of the second channel, and receives the second channel on the first receive beam of the second channel.

In a possible implementation of the first aspect, the first channel and/or the second channel are/is physical downlink control channels PDCCHs/a PDCCH or physical downlink shared channels PDSCHs/a PDSCH.

Optionally, the terminal device may further determine a default QCL reference of another downlink signal by using a method similar to the foregoing method. For example, the downlink signal may be a CSI-RS. For example, the terminal device uses a TRS, an SSB, or a first TCI state in a plurality of TCI states of the CSI-RS as a default QCL reference of the CSI-RS. The downlink signal may alternatively be another downlink signal.

Optionally, the terminal device may further determine a default QCL reference of an uplink signal or an uplink channel by using a method similar to the foregoing method. For example, the terminal device may use a TRS, an SSB, or a first TCI state in a plurality of TCI states as a default transmit beam reference of the uplink signal or the uplink channel. The uplink signal may be an SRS, and the uplink channel may be a PUCCH or a PUSCH. For example, the terminal device may use a TRS, an SSB, or a first TCI state in a plurality of TCI states as a default transmit beam reference of the SRS.

According to a second aspect, a signal transmission method is provided. The method provided in the second aspect may be performed by a network device, or may be performed by a chip disposed in a network device. This is not limited in this application.

Specifically, the method includes: sending first configuration information, where the first configuration information includes at least one transmission configuration indicator TCI state and a configuration of a tracking reference signal TRS of a first channel, and the TRS is a set including a plurality of channel state information reference signal CSI-RS resources; and sending the first channel by using a first transmit beam of the first channel. A first CSI-RS resource may be any one of a plurality of CSI-RS resources included in a first TRS. Alternatively, the first CSI-RS resource may be a CSI-RS resource with a smallest number or a largest number in the plurality of CSI-RS resources included in the first TRS, and the first configuration information may include configurations of a plurality of TRSs or include a configuration of one TRS.

According to the signal transmission method provided in the second aspect, a beam estimation process can be performed by using a more accurate QCL reference. This improves accuracy of QCL assumption, and improves efficiency of signal receiving and demodulation.

In a possible implementation of the second aspect, when the configuration information includes the configurations of the plurality of TRSs, the method further includes: sending indication information, where the indication information is used to indicate that one or more of the plurality of TRSs are activated TRSs.

In a possible implementation of the second aspect, when the configuration information includes the configurations of the plurality of TRSs, each of the plurality of TRSs includes a first field, and the first field is used to indicate that the TRS is an activated TRS.

In a possible implementation of the second aspect, the configuration of the TRS includes information about a component carrier CC or a bandwidth part BWP corresponding to the TRS.

According to a third aspect, a signal transmission method is provided. The method provided in the third aspect may be performed by a network device, or may be performed by a chip disposed in a network device. This is not limited in this application. The method includes:

determining a time domain position of a synchronization signal and PBCH block SSB; and when time domain positions of two adjacent SSBs overlap time domain positions of a plurality of channel state information reference signals CSI-RSs included in a first tracking reference signal TRS, transmitting, at a first time domain position, the plurality of CSI-RSs included in the first TRS, so that the plurality of CSI-RSs correspond to same quasi-colocation QCL information, where the two adjacent SSBs correspond to different QCL information, and the first TRS is a set including a plurality of channel state information reference signal CSI-RS resources.

According to the signal transmission method provided in the third aspect, a problem of a conflict between transmission of the TRS and transmission of the SSB can be avoided, reliability of the transmission of the TRS and the transmission of the SSB is ensured, and communication efficiency is improved.

In a possible implementation of the third aspect, the first time domain position includes the second symbol and the fifth symbol, or the fourth symbol and the seventh symbol, or the sixth symbol and the ninth symbol, or the eighth symbol and the eleventh symbol.

In a possible implementation of the second aspect, the first time domain position does not overlap the time domain positions of the two adjacent SSBs.

According to a fourth aspect, a communications apparatus is provided. The communications apparatus includes a unit configured to perform the method according to any one of the first aspect or the possible implementations of the first aspect. The unit included in the communications apparatus may be implemented by software and/or hardware.

According to a fifth aspect, a communications apparatus is provided. The communications apparatus includes a unit configured to perform the method according to any one of the second aspect or the possible implementations of the second aspect. The unit included in the communications apparatus may be implemented by software and/or hardware.

According to a sixth aspect, a communications device is provided. The communications device includes at least one processor and a communications interface. The communications interface is used by the communications device to exchange information with another communications device; and when a program instruction is executed in the at least one processor, the method according to any one of the first aspect or the possible implementations of the first aspect is implemented.

Optionally, the communications device may further include a memory. The memory is configured to store a program and data.

Optionally, the communications device may be a terminal device.

According to a seventh aspect, a communications device is provided. The communications device includes at least one processor and a communications interface. The communications interface is used by the communications device to exchange information with another communications device; and when a program instruction is executed in the at least one processor, the method according to any one of the second aspect or the possible implementations of the second aspect is implemented.

Optionally, the communications device may further include a memory. The memory is configured to store a program and data.

Optionally, the communications device may be a network device.

According to an eighth aspect, a communications apparatus is provided. The communications apparatus includes a unit configured to perform the method according to any one of the third aspect or the possible implementations of the third aspect. The unit included in the communications apparatus may be implemented by software and/or hardware.

According to a ninth aspect, a communications device is provided. The communications device includes at least one processor and a communications interface. The communications interface is used by the communications device to exchange information with another communications device; and when a program instruction is executed in the at least one processor, the method according to any one of the third aspect or the possible implementations of the third aspect is implemented.

Optionally, the communications device may further include a memory. The memory is configured to store a program and data.

Optionally, the communications device may be a network device.

According to a tenth aspect, a computer-readable storage medium is provided. The computer-readable storage medium stores program code for being executed by a communications device. The program code includes an instruction used to perform the method according to any one of the foregoing aspects or the possible implementations of the foregoing aspects.

For example, the computer-readable storage medium may store program code for being executed by a terminal device, where the program code includes an instruction used to perform the method according to any one of the first aspect or the possible implementations of the first aspect.

For example, the computer-readable medium may store program code for being executed by a network device, where the program code includes an instruction used to perform the method according to any one of the second aspect or the possible implementations of the second aspect.

According to an eleventh aspect, this application provides a computer program product including an instruction. When the computer program product is run on a communications device, the communications device is enabled to execute an instruction in the method according to any one of the foregoing aspects or the possible implementations of the foregoing aspects.

For example, when the computer program product is executed on a terminal device, the terminal device is enabled to execute an instruction in the method according to any one of the first aspect or the possible implementations of the first aspect.

For example, when the computer program product is executed on a network device, the network device is enabled to execute an instruction in the method according to any one of the second aspect or the possible implementations of the second aspect.

For example, when the computer program product is executed on a network device, the network device is enabled to execute an instruction in the method according to any one of the third aspect or the possible implementations of the third aspect.

According to a twelfth aspect, this application provides a system chip. The system chip includes an input/output interface and at least one processor, and the at least one processor is configured to invoke an instruction in a memory, to perform an operation in the method according to any one of the foregoing aspects or the possible implementations of the foregoing aspects.

Optionally, the system chip may further include at least one memory and a bus, and the at least one memory is configured to store the instruction executed by the processor.

According to a thirteenth aspect, a communications system is provided. The system includes the foregoing network device and terminal device.

BRIEF DESCRIPTION OF DRAWINGS

FIG. 10 is a schematic diagram of a format of a MAC-CE:

DETAILED DESCRIPTION OF EMBODIMENTS

Figure 1:
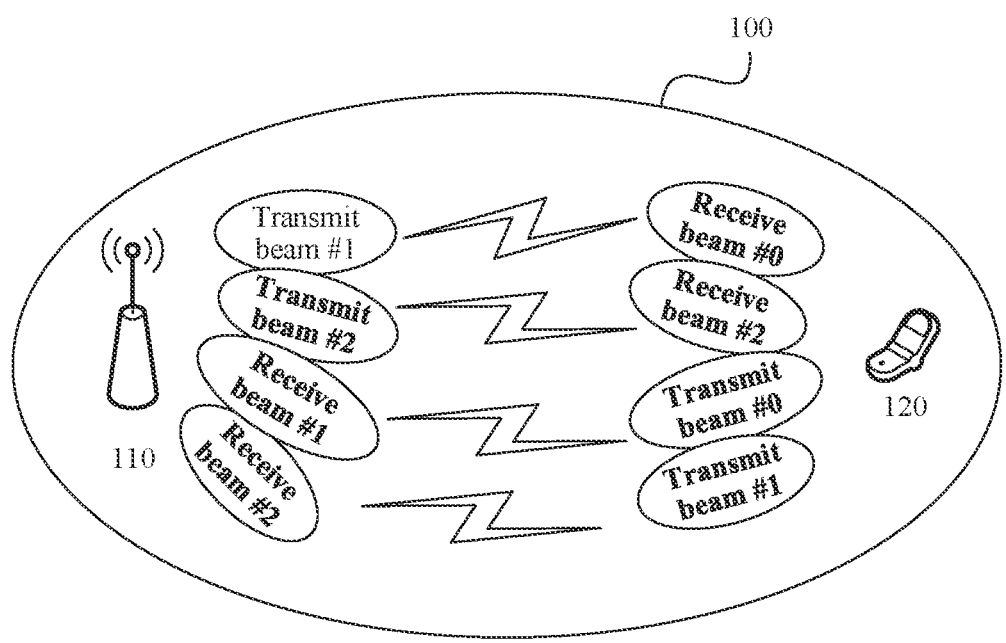
FIG. 1 is a schematic diagram of a communications system applicable to a signal transmission method according to an embodiment of this application.

The following describes technical solutions of this application with reference to the accompanying drawings.

The technical solutions of embodiments of this application may be applied to various communications systems, for example, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in a global system for mobile communications (GSM) system or a code division multiple access (CDMA) system, or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), or a memory (also referred to as a main memory). The operating system may be any one or more types of computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a function module that can invoke and execute the program in the terminal device or the network device.

In addition, aspects or features of this application may be implemented as a method, an apparatus or a product that uses standard programming and/or engineering technologies. The term "product" used in this application covers a computer program that can be accessed from any computer readable component, carrier or medium. For example, the computer readable medium may include but is not limited to: a magnetic storage component (for example, a hard disk, a floppy disk, or a magnetic tape), an optical disc (for example, a compact disc (CD) or a digital versatile disc (DVD)), or a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, contain, and/or carry an instruction and/or data.

For ease of understanding the embodiments of this application, a communications system applicable to the embodiments of this application is described in detail with reference to FIG. 1.

FIG. 1 is a schematic diagram of a communications system 100 applicable to an embodiment of this application. As shown in FIG. 1, the communications system 100 includes at least one network device 110 and at least one terminal device 120. In the communications system 100, the terminal device and the network device may obtain one or more beam pairs with better communication in a beam management process. The beam pairs are <Bx, B'x> and <By, B'y>, where Bx represents a transmit beam of the network device, B'x represents a receive beam of the terminal device, By represents a transmit beam of the terminal device, and B'y represents a receive beam of the network device. For example, referring to FIG. 1, a transmit beam #1 of the network device and a receive beam #0 of the terminal device are a beam pair, and a transmit beam #2 of the network device and a receive beam #2 of the terminal device are a beam pair. A transmit beam #0 of the terminal device and a receive beam #1 of the network device are a beam pair, and a transmit beam #1 of the terminal device and a receive beam #2 of the network device are a beam pair.

In the communications system 100, beams of the terminal device 120 and the network device 110 need to be aligned to perform normal communication. Because the terminal device and the network device each can face toward a plurality of beam directions, a prerequisite for communication is that a correct beam indication is required. Specifically, in downlink communication, the network device needs to notify the terminal device of a receive beam that should be used to receive a signal sent by the network device subsequently, or notify the terminal device of a transmit beam that is used by the network device to send a signal subsequently. In uplink communication, the network device needs to notify the terminal device of a transmit beam that should be used to send an uplink signal, or notify the terminal device of a receive beam that is used by the network device to receive a signal sent by the terminal device. For example, in the downlink transmission, the network device may notify the terminal device that the network device performs the transmission by using the transmit beam #1, so that the terminal device needs to perform receiving by using the receive beam #0. Alternatively, the network device performs the transmission by using the transmit beam #1, and notifies the terminal device to perform receiving by using the receive beam #0. For another example, in the uplink transmission, the network device may notify the terminal device to perform the transmission by using the transmit beam #0, so that the network device performs receiving by using the receive beam #1. Alternatively, the network device may notify that a receive beam used by the network device is the receive beam #0, so that the terminal device needs to perform the transmission by using the transmit beam #0.

For ease of understanding the embodiments of this application, the following briefly describes several terms in this application.

1. Beam: The beam is a communication resource. The beam may be a wide beam, a narrow beam, or a beam of another type. A technology for forming the beam may be a beamforming technology or another technical means. The beamforming technology may be specifically a digital beamforming technology, an analog beamforming technology, or a hybrid digital/analog beamforming technology. Different beams may be considered as different resources. Same information or different information may be sent by using different beams. Optionally, a plurality of beams having a same or similar communication feature may be considered as one beam. One beam may include one or more antenna ports, configured to transmit a data channel, a control channel, a sounding signal, and the like.

The beam may alternatively be understood as a spatial resource, and may be a transmit or receive precoding vector having an energy transmission direction. The energy transmission direction may indicate that a signal, received in a spatial position, on which precoding processing is performed by using the precoding vector has a relatively good receive power, for example, meets a received demodulation signal to noise ratio. The energy transmission direction may also indicate that same signals sent from different spatial positions and received by using the precoding vector have different receive powers. A same device (for example, a network device or a terminal device) may have different precoding vectors, and different devices may also have different precoding vectors, to be specific, the different precoding vectors correspond to different beams. For a configuration or a capability of a device, one device may use one or more of a plurality of different precoding vectors at a same moment, in other words, one or more beams may be formed at the same time. From perspectives of transmitting and receiving, beams can be classified into a transmit beam and a receive beam.

The transmit beam is a directional beam transmitted by a multi-antenna by using the beamforming technology.

The receive beam is also directional in a direction of receiving a signal, and is directed to a direction of arrival of a transmit beam as much as possible, to further improve a received signal-to-noise indicator and avoid interference between users.

The beam may also be referred to as a spatial filter, or referred to as a spatial filter or a spatial parameter. The transmit beam may also be referred to as a spatial transmit filter, and the receive beam may also be referred to as a spatial receive filter.

2. Beam pairing relationship: The beam pairing relationship is a pairing relationship between a transmit beam and a receive beam, that is, a pairing relationship between a spatial transmit filter and a spatial receive filter. A relatively large beamforming gain can be obtained by transmitting a signal between a transmit beam and a receive beam that have a beam pairing relationship.

In an implementation, a transmit end and a receive end may obtain a beam pairing relationship through beam training. Specifically, the transmit end may send a reference signal in a beam sweeping manner, and the receive end may also receive the reference signal in the beam sweeping manner. Specifically, the transmit end may form different directional beams in space in a beamforming manner, and may perform polling on a plurality of different directional beams, to transmit reference signals by using the different directional beams, so that a power of transmitting a reference signal by the transmit end can reach a maximum value in a direction directed by a transmit beam. The receive end may also form different directional beams in space in the beamforming manner, and may perform polling on a plurality of different directional beams, to receive reference signals by using the different directional beams, so that a power of receiving a reference signal by the receive end can reach a maximum value in a direction directed by a receive beam.

3. Reference signal and reference signal resource: The reference signal may be used for channel measurement, channel estimation, or the like. The reference signal resource may be used to configure a transmission attribute of the reference signal, for example, a time-frequency resource position, a port mapping relationship, a power factor, and a scrambling code. For details, refer to the current technology. A transmit end device may send the reference signal based on the reference signal resource, and a receive end device may receive the reference signal based on the reference signal resource.

The channel measurement in this application also includes beam measurement. To be specific, beam quality information is obtained by measuring the reference signal, and a parameter used to measure a beam quality includes a reference signal received power (RSRP). However, this is not limited thereto. For example, the beam quality may alternatively be measured by using parameters such as a reference signal received quality (RSRQ), a signal-to-noise ratio (SNR), a signal to interference plus noise ratio (SINR), a block error rate (BLER), and a signal quality indicator CQI). In the embodiments of this application, for ease of description, unless otherwise specified, the channel measurement may be considered as the beam measurement.

The reference signal may include, for example, a channel state information reference signal (CSI-RS), a synchronization signal block (SSB), or a sounding reference signal (SRS). Correspondingly, the reference signal resource may include a CSI-RS resource, an SSB resource, or an SRS resource.

It should be noted that the foregoing SSB may also be referred to as a synchronization signal/physical broadcast channel block (SS/PBCH block); and the corresponding SSB resource may also be referred to as a synchronization signal/physical broadcast channel block resource (SS/PBCH block resource), and may be referred to as an SSB resource for short.

To distinguish between different reference signal resources, each reference signal resource may correspond to a reference signal resource identifier, for example, a CSI-RS resource indicator CRI), an SSB resource indicator SSBRI), or an SRS resource index (SRI). The SSB resource identifier may also be referred to as an SSB index.

It should be understood that the reference signals and corresponding reference signal resources listed above are merely examples for description, and shall not constitute any limitation on this application. This application does not exclude a possibility of defining another reference signal in a future protocol to implement a same or similar function.

4. Beam indication information: The beam indication information is used to indicate information about a beam used for transmission. The beam used for the transmission includes a transmit beam and/or a receive beam. The beam indication information may be one or more of the following: a beam number (or a number, an index ( ), an identifier (ID), or the like), an uplink signal resource number, a downlink signal resource number, an absolute index of the beam, a relative index of the beam, a logic index of the beam, an index of an antenna port corresponding to the beam, an index of an antenna port group corresponding to the beam, an index of a downlink signal corresponding to the beam, a time index of a downlink synchronization signal block corresponding to the beam, beam pair link (BPL) information, a transmit parameter (Tx parameter) corresponding to the beam, a receive parameter (Rx parameter) corresponding to the beam, a transmit weight corresponding to the beam, a weight matrix corresponding to the beam, a weight vector corresponding to the beam, a receive weight corresponding to the beam, an index of a transmit weight corresponding to the beam, an index of a weight matrix corresponding to the beam, an index of a weight vector corresponding to the beam, an index of a receive weight corresponding to the beam, a receive codebook corresponding to the beam, a transmit codebook corresponding to the beam, an index of a receive codebook corresponding to the beam, or an index of a transmit codebook corresponding to the beam. The downlink signal may be one or more of the following: a synchronization signal, a broadcast channel, a broadcast signal demodulation signal, a synchronization signal and PBCH block (synchronous signal/PBCH block, SSB), a channel state information reference signal (CSI-RS), a cell-specific reference signal (al, CS-RS), a UE-specific reference signal (US-RS), a downlink control channel demodulation reference signal (DMRS), a downlink data channel demodulation reference signal, or a downlink phase tracking reference signal. An uplink signal may be one or more of the following: an uplink random access sequence, an uplink sounding reference signal (SRS), an uplink control channel demodulation reference signal, an uplink data channel demodulation reference signal, or an uplink phase tracking reference signal.

The beam indication information may alternatively be represented as a transmission configuration indicator (TCI) or a TCI state. One TCI state includes one or more pieces of QCL information, and each piece of QCL information includes an ID of one reference signal (or one synchronization signal block) and one QCL type. For example, a terminal device may need to determine, based on a TCI state (which is usually carried on a physical downlink control channel (PDCCH)) indicated by a network device, a beam for receiving a physical downlink shared channel (PDSCH).

5. Quasi-colocation (QCL): A quasi-colocation relationship is used to indicate that a plurality of resources have one or more same or similar communication features. For the plurality of resources that have the quasi-colocation relationship, a same or similar communications configuration may be used. Details are as follows: Signals corresponding to antenna ports that have a QCL relationship have a same parameter, or a parameter (which may also be referred to as a QCL parameter) of an antenna port may be used to determine a parameter of another antenna port that has a QCL relationship with the antenna port, or two antenna ports have a same parameter, or a parameter difference between two antenna ports is less than a threshold. The parameters may include one or more of the following: a delay spread a Doppler spread, a Doppler shift, an average delay, an average gain, and a spatial receive parameter (spatial Rx parameter). The spatial receive parameter may include one or more of the following: an angle of arrival (AOA), an average AOA, an AOA spread, an angle of departure (AOD), an average angle of departure AOD, an AOD spread, a receive antenna spatial correlation parameter, a transmit antenna spatial correlation parameter, a transmit beam, a receive beam, or a resource identifier.

In an NR protocol, the QCL relationship may be classified into the following four types based on different parameters:

type A: Doppler shift, Doppler spread, average delay, and delay spread;

type B): Doppler shift and Doppler spread;

type C): Doppler shift and average delay; and type D): spatial receive parameter.

6. Quasi-colocation assumption (QCL assumption): The QCL assumption means that it is assumed that whether there is a QCL relationship between two ports. A configuration and an indication of the quasi-colocation assumption may be used to help a receive end receive and demodulate a signal. For example, the receive end can assume that there is a QCL relationship between a port A and a port B, that is, a large-scale parameter that is of a signal and that is measured on the port A may be used for signal measurement and demodulation on the port B. The large-scale parameter may include a parameter of an antenna port.

7. Transmission configuration indicator (TCI) state: The TC state may be used to indicate a QCL relationship between two types of reference signals. Each TC state may include a serving cell index, a bandwidth part (BWP) identifier (ID), and a reference signal resource identifier. The reference signal resource identifier may be, for example, at least one of the following: a non-zero power (NZP) CSI-RS reference signal resource identifier (NZP-CSI-RS-ResourceId), a non-zero power CSI-RS reference signal resource set identifier (NZP-CSI-RS-ResourceSetId), or an SSB index. A TCI state may be distinguished by using an identifier (TCI-StateId) of the TC state.

The serving cell index, the BWP ID, and the reference signal resource identifier indicate a reference signal resource used in a beam training process, a corresponding serving cell, and a corresponding BWP. In the beam training process, a network device sends, by using different transmit beams, reference signals based on different reference signal resources, and therefore, the reference signals sent by using the different transmit beams may be associated with the different reference signal resources; a terminal device receives, by using different receive beams, reference signals based on different reference signal resources, and therefore, the reference signals received by using the different receive beams may also be associated with the different reference signal resources. Therefore, in the beam training process, the terminal device may maintain a correspondence among a serving cell index, a BWP ID, a reference signal resource identifier, and a receive beam, and the network device may maintain a correspondence among a serving cell index, a BWP ID, a reference signal resource identifier, and a transmit beam. A pairing relationship between a receive beam and a transmit beam may be established by using a reference signal resource identifier.

In a subsequent communication process, the terminal device may determine a receive beam based on a TC state indicated by the network device, and the network device may determine a transmit beam based on the same TC state.

8. TCI: The TCI may be used to indicate a TC state.

In an implementation, a network device may configure a TCI state list for a terminal device by using higher layer signaling (for example, a radio resource control (RRC) message). For example, the network device may configure the TCI state list for the terminal device by using a TCI state to add mode list (tci-StatesToAddModList) in the RRC message. The TC state list may include a plurality of TCI states. For example, the network device may configure a maximum of 64 TC states for each bandwidth part (BWP) in each cell.

Then, the network device may activate one or more TCI states by using higher layer signaling (for example, a media access control MAC) control element (CE)). The activated TCI state is a subset of the TC state list configured in the RRC message. For example, the network device may activate a maximum of eight TCI states for each BWP in each cell.

Then, the network device may further indicate a selected TC state by using a TC field in physical layer signaling (for example, downlink control information (DCI)). The DCI may be, for example, applicable to DCI for scheduling a physical downlink resource.

9. Bandwidth part (BWP): In NR different terminal devices in a same cell may have different transmitting or receiving capabilities. Therefore, a system may configure a corresponding bandwidth for each terminal device. The bandwidth configured for the terminal device is referred to as a BWP, and the terminal device performs transmission on the BWP of the terminal device. The BWP may be a group of contiguous frequency domain resources on a carrier. Different BWPs may occupy frequency domain resources that partially overlap, or may occupy frequency domain resources that do not overlap. Different BWPs occupy frequency domain resources in a same bandwidth or different bandwidths. This is not limited in this application.

10. Carrier (component carrier, CC): The carrier may alternatively be referred to as a component carrier, a component carrier, a component carrier, or the like.

Carrier aggregation is mainly to aggregate a plurality of component carriers (CC, or referred to as a component carrier, a component carrier, a carrier, or the like) into a carrier with a relatively large bandwidth, to support high-speed data transmission. In the carrier aggregation, it is allowed to schedule another CC to transmit data on a CC, for example, a physical downlink control channel (PDCCH) and a physical downlink shared channel (PDSCH) are on a same CC or on different CCs. A CC may include one or more BWPs. In the embodiments of this application, a cell may be replaced with a serving cell or a CC. In the embodiments of this application, terms "cell", "serving cell", and "CC" are used alternatively, and meanings expressed by the terms are consistent when differences between the terms are not emphasized. Similarly, terms "serving cell index", "serving cell identifier (ID)", "cell identifier (cell ID)", and "CC identifier (CC ID)" are used alternatively, and meanings expressed by the terms are consistent when differences between the terms are not emphasized.

11. Random access process: A random access process of a high-frequency communications system roughly includes: (a) A terminal device discovers an available downlink beam; (b) the terminal device sends a random access channel (RACH) or a random access preamble (RACH preamble); (c) a network device sends a random access response; (d) the terminal device sends an uplink message based on the random access response; (e) the network device returns a conflict resolution message; and (f) the terminal device accesses a network. A simplified random access procedure may not include steps (d) and (f). The random access process may have a plurality of scenarios, for example, initial access (initial access), which is applicable to a case in which the terminal device is just powered on or just moves to a cell; radio link failure recovery, which is applicable to a case in which the terminal device initiates re-access after experiencing a relatively poor link quality for a relatively long time; beam failure recovery (beam/link failure recovery), which is applicable to a case in which the terminal device initiates beam switching when a quality of a serving beam of the terminal device is relatively poor; and another random access process triggered by the network device, for example, a random access process triggered by a PDCCH order. In the high-frequency communications system, according to the random access process, the network device and the terminal device may determine one or more available beams or beam pairs.

Before the network device sends a signal to the terminal device, the network device notifies the terminal device of all available TCI states of the terminal device. A method in which the network device notifies the terminal device of a TCI state includes, but is not limited to, using a broadcast signal, a system message, RRC signaling, MAC-CE signaling, DCI signaling, or a combination thereof. Before the network device activates one or more of the available TC states by using an activation command, the terminal device also needs to receive the signal sent by the network device. Because the network device has not sent the activation command, the terminal device does not know a specific available TC state that needs to be used to determine a receive beam, and consequently cannot receive the signal on the receive beam. Therefore, the terminal device needs to perform QCL assumption. Through the QCL assumption, before receiving the activation command of the network device, the terminal device determines information about a beam used to receive the signal, and receives the signal on the beam. In the current technology, in a process in which a terminal device performs QCL assumption, an SSB in an initial access process is used as a default QCL reference, that is, a parameter of an antenna port for transmitting the SSB is used to determine a parameter of an antenna port for receiving a signal, to determine a beam used to receive the signal. The signal herein may be a physical downlink control channel PDCCH or a physical downlink shared channel PDSCH. Because a time interval between a time point at which initial access is completed and a time point at which the PDCCH/PDSCH is received may be relatively large, an expired QCL reference signal (an SSB determined in the initial access process) is unfavorable to receiving and demodulation of the PDCCH/PDSCH. In addition, because a bandwidth of the SSB is relatively small, performance of time domain and frequency domain tracking performed by using the SSB is relatively poor. Consequently, a determined QCL parameter for receiving the signal is inaccurate, and signal receiving and demodulation are severely affected.

In view of this, this application provides a signal transmission method, so that a terminal device can perform a beam estimation process by using a more accurate QCL reference. This improves accuracy of QCL assumption, so that the terminal device receives a signal on a more accurate beam; and improves efficiency of receiving and demodulation of the signal.

The following describes the embodiments of this application in detail with reference to the accompanying drawings.

Figure 2:
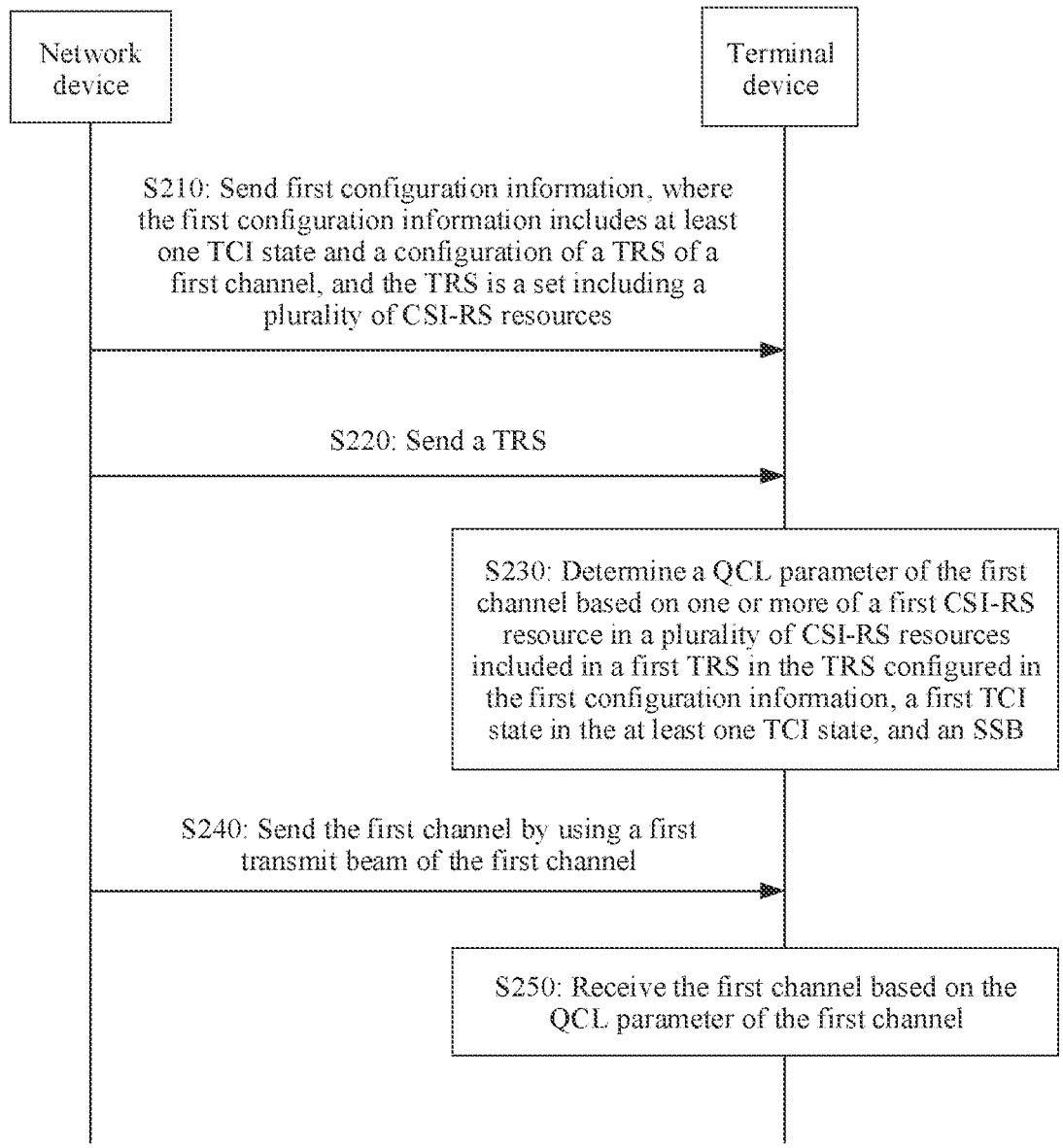
FIG. 2 is a schematic flowchart of a signal transmission method according to an embodiment of this application.

FIG. 2 is a schematic flowchart, shown from a perspective of device interaction, of a signal transmission method 200.

As shown in FIG. 2, the method 200 shown in FIG. 2 may include step S210 to step S250. The following describes the steps in the method 200 in detail with reference to FIG. 2.

It should be understood that in this embodiment of this application, the method 200 is described by using an example in which the method 200 is performed by a terminal device and a network device. By way of example, and not limitation, the method 200 may alternatively be performed by a chip used in a terminal device and a chip used in a network device.

S210: The network device sends first configuration information to the terminal device, where the first configuration information includes at least one transmission configuration indicator TCI state and a configuration of a tracking reference signal TRS of a first channel, and the TRS is a set including a plurality of channel state information reference signal CSI-RS resources. Correspondingly, the terminal device receives the first configuration information.

S220: The network device sends a TRS to the terminal device, where the TRS may be the TRS configured in the first configuration information. Correspondingly, the terminal device receives the TRS.

S230: Before receiving an activation command that is sent by the network device and that is used to activate one or more of the at least one TC state, the terminal device determines a quasi-colocation QCL parameter of the first channel based on one or more of a first CSI-RS resource in a plurality of CSI-RS resources included in a first TRS in the TRS configured in the first configuration information, a first TC state in the at least one TC state, and a synchronization signal and PBCH block SSB.

S240: The network device sends the first channel by using a first transmit beam of the first channel.

S250: The terminal device receives the first channel based on the QCL parameter of the first channel.

According to the signal transmission method provided in this application, in a process in which the terminal device performs QCL assumption before receiving the activation command specific to a plurality of TCI states of the first channel, the TRS, the SSB, or the first TC state in the plurality of TCI states may be used as a default QCL reference of the first channel. Therefore, the QCL parameter of the first channel is determined, and a receive beam of the first channel is determined, so that the first channel is received on the receive beam. In this way, the terminal device performs a beam estimation process by using a more accurate QCL reference. This improves accuracy of the QCL assumption, so that the terminal device receives the first channel on a more accurate beam and improves efficiency of receiving and demodulation of the first channel. This further improves communication efficiency and user experience.

Specifically, in S210, after the terminal device and the network device establish a communication connection, when the network device needs to send a signal to the terminal device, the network device needs to notify the terminal device of information about a transmit beam and/or a receive beam of the signal. This helps the terminal device receive the signal on a correct receive beam. Therefore, the network device sends the first configuration information to the terminal device, where the first configuration information includes the at least one transmission configuration indicator TCI state and the configuration of the tracking reference signal TRS of the first channel. The TRS is a resource set (CSI-RS resource set) including a plurality of channel state information reference signal CSI-RS resources, that is, each TRS is a resource set including a plurality of channel state information reference signal CSI- RS resources. Certainly, one TRS may alternatively include one channel state information reference signal CSI-RS resource. That is, one TRS is one CSI-RS resource. The first configuration information may be carried in RRC signaling. The at least one TC state is a list, configured by the network device for the terminal device, of available TC states. The terminal device may determine the receive beam of the first channel based on the TCI state. For example, the network device may configure the TC state list for the terminal device by using a TCI state to add mode list (tci-StatesToAddMod-List) in an RRC message. The TC state list may include a plurality of TC states. For example, the network device may configure a maximum of 64 TC states for each BWP in each cell. Correspondingly, the terminal device receives the first configuration information.

In S220, because the TRS available to the terminal device is configured in the first configuration information, the network device sends the TRS to the terminal device. Correspondingly, the terminal device receives the TRS. The TRS sent by the network device may be one or more TRSs configured in the first configuration information, or may be one or more of a plurality of TRSs configured in the first configuration information. For example, the first configuration information includes configurations of a TRS 1 to a TRS 10. The network device sends TRSs to the terminal device. The TRSs may be the TRS 1 to the TRS 6. This is not limited in this embodiment of this application.

In S230, because the terminal device needs to receive a signal (the first channel), the network device has notified the terminal device of a possible TCI state. Therefore, before the terminal device receives the activation command that is sent by the network device and that is used to activate the one or more of the at least one TC state, the terminal device needs to perform the QCL assumption. That is, before receiving the activation command of the network device, the terminal device needs to determine information about a beam used to receive the signal (the first channel), and receives the signal on the beam.

Specifically, the terminal device determines the QCL parameter of the first channel based on one or more of the first CSI-RS resource in the plurality of CSI-RS resources included in the first TRS in the received TRS, the first TCI state in the at least one TCI state, and the synchronization signal and PBCH block SSB. The QCL parameter of the first channel may include information about the receive beam of the first channel. For specific content included in the QCL parameter, refer to the foregoing descriptions of QCL. That the QCL parameter of the first channel is determined means that a first receive beam of the first channel is determined.

In a possible implementation, in S230, the terminal device may alternatively determine one of the first CSI-RS resource, the first TC state in the at least one TCI state, and the synchronization signal and PBCH block SSB as the QCL reference (which is the default QCL reference) of the first channel. For example, the default QCL reference is the first CSI-RS resource. Then, the QCL parameter of the first channel is determined based on the determined QCL reference, and the first receive beam of the first channel is determined based on the QCL parameter of the first channel. This is not limited in this embodiment of this application.

It should be understood that the first CSI-RS resource may be any one of the plurality of CSI-RS resources included in the first TRS. Alternatively, the first CSI-RS resource may be a CSI-RS resource with a smallest number or a largest number in the plurality of CSI-RS resources included in the first TRS, or a CSI-RS resource that has a shortest interval from a time of the first channel. This is not limited in this embodiment of this application.

It should be further understood that when the first configuration information includes only a configuration of one TRS, the first TRS is the TRS configured in the first configuration information. When the first configuration information includes configurations of a plurality of TRSs, the first TRS is one of the plurality of TRSs configured in the first configuration information. For example, the first TRS may be a TRS with a smallest number or a largest number in the TRSs, or a TRS that has a shortest interval from the time of the first channel. Because each TRS is a resource set including a plurality of channel state information reference signal CSI-RS resources, a number of the TRS may be a number of a CSI-RS resource set. A quantity of TRSs configured in the first configuration information is not limited in this application.

In S240, the network device sends the first channel by using the first transmit beam of the first channel, where the first transmit beam of the first channel may be one or more of a beam used by the first CSI-RS resource in the plurality of CSI-RS resources included in the first TRS in the sent TRS, a beam corresponding to the first TCI state in the at least one TC state, or a beam used to send the synchronization signal and PBCH block SSB. The first transmit beam of the first channel may alternatively be a current valid beam of the first channel, and the current valid beam may be understood as a beam used by the network device to send a signal previously.

In S250, because the terminal device has determined the QCL parameter of the first channel, that is, has determined the first receive beam of the first channel, the terminal device may receive the first channel based on the QCL parameter of the first channel. That is, the first channel is received on the first receive beam.

According to the signal transmission method provided in this application, in the process in which the terminal device performs the QCL assumption before receiving the activation command specific to the plurality of TC states of the first channel, the TRS, the SSB, or the first TC state in the plurality of TC states may be used as the default QCL reference of the first channel, instead of using only the SSB as the default QCL reference of the first channel. In this way, the terminal device can perform the beam estimation process by using the more accurate QCL reference. This improves the accuracy of the QCL assumption, and improves the efficiency of receiving and demodulation of the first channel. This further improves the communication efficiency and the user experience.

Figure 3:
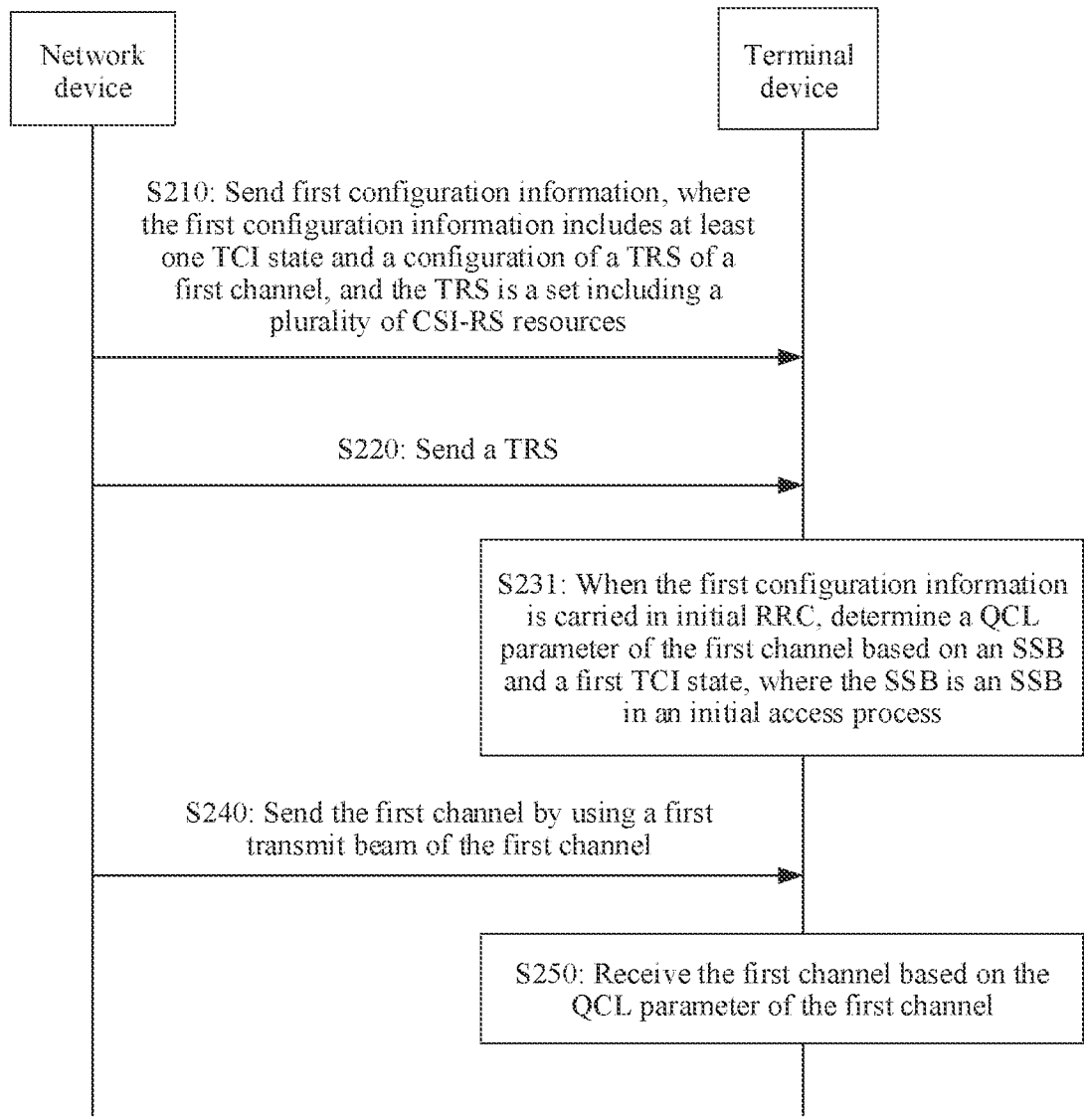
FIG. 3 is a schematic flowchart of a signal transmission method according to another embodiment of this application.

In an embodiment, FIG. 3 is a schematic flowchart, shown from a perspective of device interaction, of another embodiment of the signal transmission method 200. When the first configuration information is carried in initial radio resource control RRC, in step S230, that the terminal device determines a QCL parameter of the first channel based on one or more of a first CSI-RS resource, a first TC state, and an SSB includes the following step.

S231: Determine the QCL parameter of the first channel based on the SSB or the first TC state, where the first TCI state is a TCI state with a smallest TC state number in the at least one TC state, and the SSB is an SSB in an initial access process.

Specifically, after the terminal device initially accesses a network, the network device sends corresponding control signaling to the terminal device by using RRC signaling. If the first configuration information is carried in first RRC (the initial RRC) obtained after the terminal device initially accesses the network, it indicates that an interval between a time point at which the first configuration information is received and a time point at which initial access is completed is not very long. Therefore, in step S231, the terminal device may determine the QCL parameter of the first channel based on the SSB or the first TCI state. The first TCI state is the TCI state with the smallest TCI state number in the at least one TCI state, and the SSB is the SSB used by the terminal device in the initial access process. Optionally, the first TCI state may alternatively be a TCI state with a largest TCI state number in the at least one TCI state. Alternatively, the first TCI state may be a TCI state, in the at least one TC state, whose TCI state number has an intermediate value, or the like. This is not limited in this embodiment of this application.

When the first configuration information is carried in the initial RRC, the QCL parameter of the first channel is determined based on the SSB in the initial access process or the first TC state, so that a time period of determining the QCL parameter of the first channel can be reduced, and accuracy of the determined QCL parameter of the first channel is also relatively high. This further improves accuracy of receiving the first channel by the terminal device.

Figure 4:
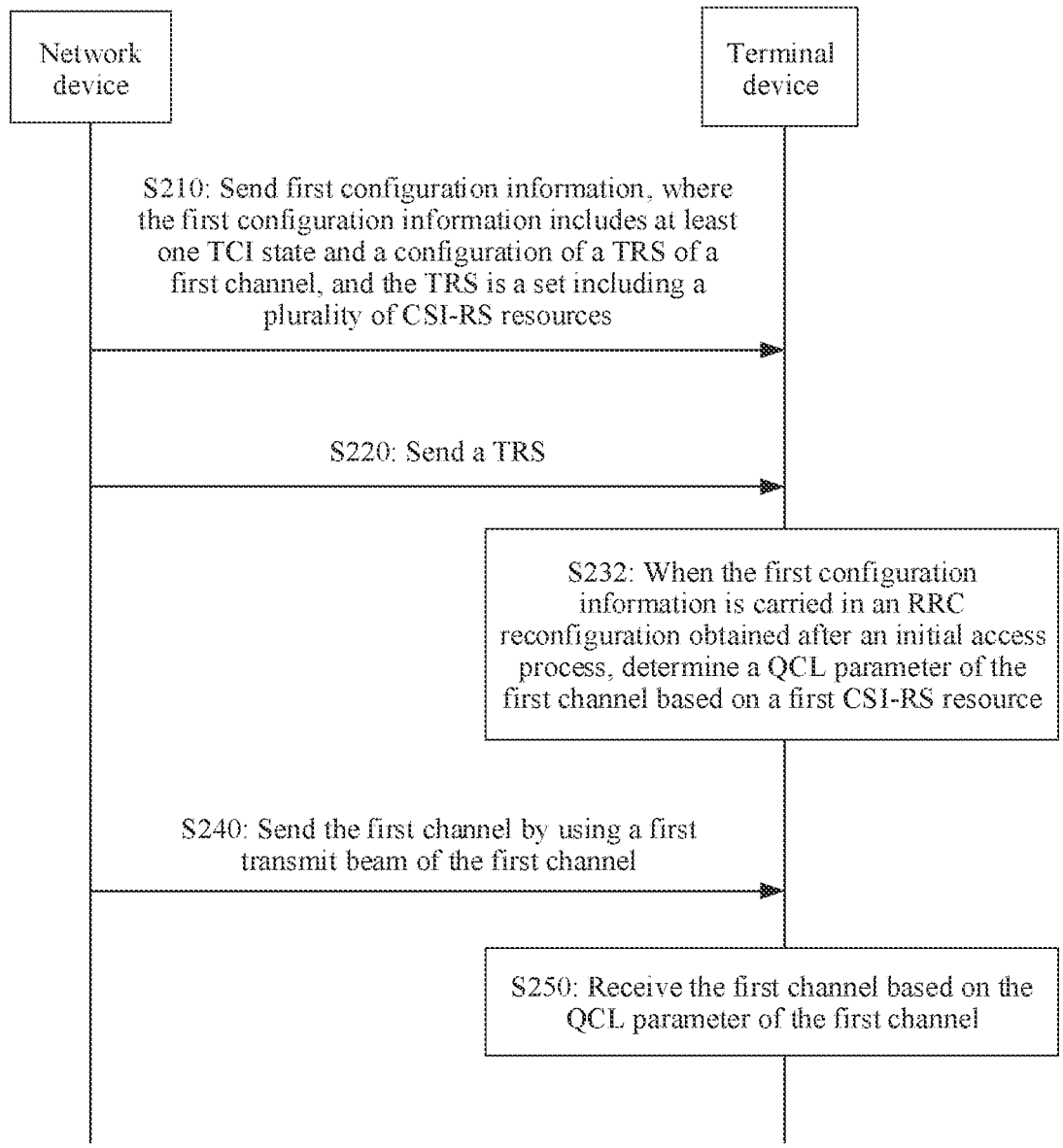
FIG. 4 is a schematic flowchart of a signal transmission method according to another embodiment of this application.

In an embodiment, FIG. 4 is a schematic flowchart, shown from a perspective of device interaction, of another embodiment of the signal transmission method 200. When the first configuration information is carried in a radio resource control RRC reconfiguration obtained after an initial access process, in step S230, that the terminal device determines a QCL parameter of the first channel based on one or more of a first CSI-RS resource, a first TC state in the at least one TCI state, and an SSB includes the following step.

S232: Determine the QCL parameter of the first channel based on the first CSI-RS resource.

Specifically, after the terminal device initially accesses a network, the network device sends corresponding control signaling to the terminal device by using RRC signaling. The first configuration information is carried in the RRC reconfiguration, where the RRC reconfiguration may be understood as an RRC configuration received after initial RRC after the terminal device initially accesses the network. That is, the RRC reconfiguration is RRC received after first RRC after the terminal device accesses the network. If the first configuration information is carried in the RRC reconfiguration, it indicates that an interval between a time point at which the first configuration information is received and a time point at which initial access is completed is relatively long, and a result of determining the QCL parameter of the first channel by using the SSB or the first TCI state may be inaccurate. Therefore, in step S232, the terminal device determines the QCL parameter of the first channel based on the first CSI-RS resource.

When the first configuration information is carried in the RRC reconfiguration, the QCL parameter of the first channel is determined based on the first CSI-RS resource. This can improve accuracy of the determined QCL parameter of the first channel. This further improves accuracy of receiving the first channel by the terminal device.

Figure 5:
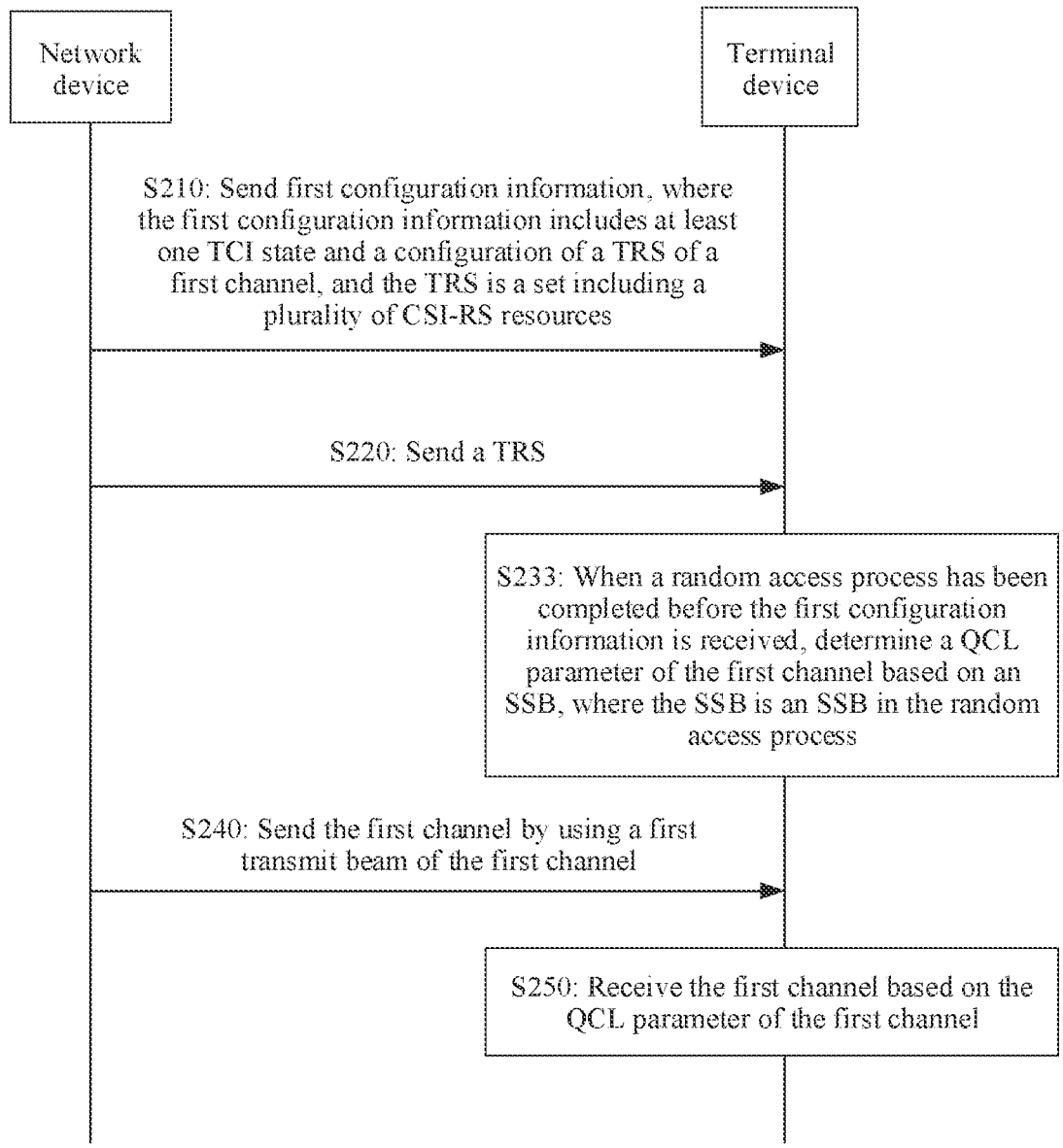
FIG. 5 is a schematic flowchart of a signal transmission method according to still another embodiment of this application.

In an embodiment, FIG. 5 is a schematic flowchart, shown from a perspective of device interaction, of another embodiment of the signal transmission method 200. When a random access process has been completed before the first configuration information is received, in step S230, that the terminal device determines a QCL parameter of the first channel based on one or more of a first CSI-RS resource, a first TCI state in the at least one TC state, and an SSB includes the following step.

S233: Determine the QCL parameter of the first channel based on the SSB, where the SSB is an SSB in the random access process.

Specifically, after accessing a network in an initial access process, the terminal device may still perform the random access process, to re-perform uplink synchronization with an accessed cell, restore a link, and so on. If the terminal device has completed the random access process before receiving the first configuration information, it indicates that an interval between a time point at which the terminal device performs the QCL assumption and a time point at which the random access process is completed is not long. Therefore, in step S233, the terminal device may determine the QCL parameter of the first channel based on the SSB used in the random access process. Optionally, the terminal device may alternatively determine the QCL parameter of the first channel based on a CSI-RS used in the random access process. In an implementation, a time length X may be predefined in a protocol or notified by the network device. If the terminal device has performed the random access process within a time period of the length X before a time point at which the first configuration information is received, the terminal device may determine the QCL parameter of the first channel based on the SSB and/or a CSI-RS used in the random access process. A time unit of the time length X may include but is not limited to a symbol time, a slot, a subframe, a frame, or a millisecond.

When the random access process has been completed before the first configuration information is received, the QCL parameter of the first channel is determined based on the SSB in the random access process, so that a time period of determining the QCL parameter of the first channel can be reduced, and accuracy of the determined QCL parameter of the first channel is also relatively high. This further improves accuracy of receiving the first channel by the terminal device.

Figure 6:
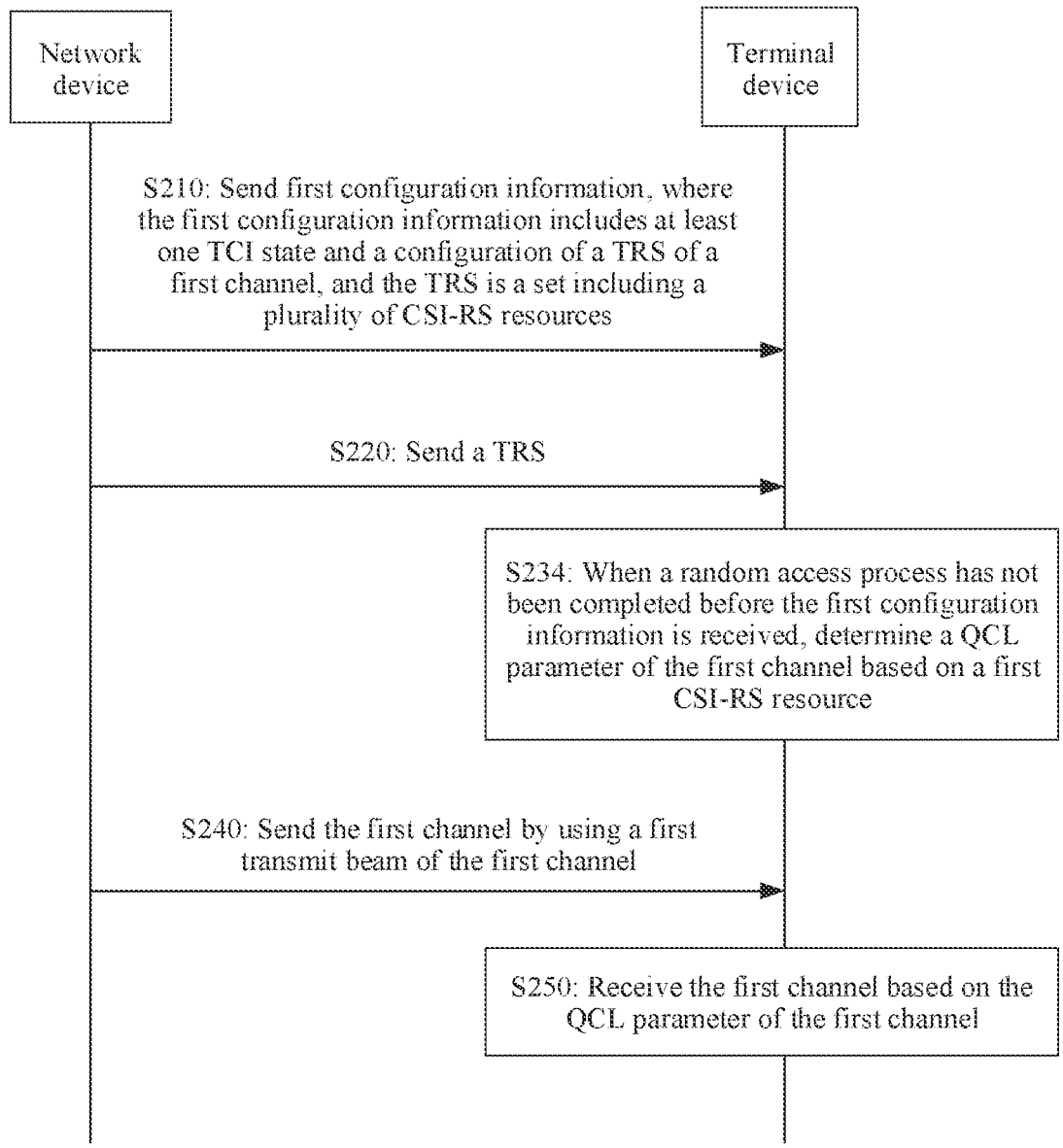
FIG. 6 is a schematic flowchart of a signal transmission method according to another embodiment of this application.

In an embodiment, FIG. 6 is a schematic flowchart, shown from a perspective of device interaction, of another embodiment of the signal transmission method 200. When a random access process has not been completed before the first configuration information is received, in step S230, that the terminal device determines a QCL parameter of the first channel based on one or more of a first CSI-RS resource, a first TCI state, and an SSB includes the following step.

S234: Determine the QCL parameter of the first channel based on the first CSI-RS resource.

Specifically, if the terminal device has not completed the random access process before receiving the first configuration information, in the process of performing the QCL assumption, that is, in step S234, the terminal device may determine the QCL parameter of the first channel based on the first CSI-RS resource. In an implementation, a time length X may be predefined in a protocol or notified by the network device. If the terminal device has not performed the random access process within a time period of the length X before a time point at which the first configuration information is received, the terminal device determines the QCL parameter of the first channel based on the first CS-RS resource.

When the terminal device has not completed the random access process before receiving the first configuration information, the terminal device determines the QCL parameter of the first channel based on the first CSI-RS resource. This can improve accuracy of the determined QCL parameter of the first channel. This further improves accuracy of receiving the first channel by the terminal device.

It should be understood that, in this embodiment of this application, in addition to determining, based on the foregoing several conditions, to use one or more of the first CSI-RS resource, the first TC state, and the SSB to determine the QCL parameter of the first channel, a specific one, to be used to determine the QCL parameter of the first channel, of the first CSI-RS resource, the first TCI state, and the SSB may alternatively be determined based on another condition. For example, a specific one, to be used to determine the QCL parameter of the first channel, of the first CSI-RS resource, the first TCI state, and the SSB may be further determined with reference to network quality of the terminal device and the like. This is not limited in this embodiment of this application.

In a possible implementation, when the first configuration information includes configurations of a plurality of TRSs, the first TRS is a TRS with a smallest number or a largest number in the plurality of TRSs configured in the first configuration information.

In another possible implementation, when the first configuration information includes configurations of a plurality of TRSs, the first TRS is a TRS received at a receiving moment that is in receiving moments of the plurality of TRSs configured in the first configuration information and that has a shortest time interval from a moment at which the terminal device determines the QCL reference of the first channel. That is, in the plurality of TRSs, a time interval between the receiving moment of the first TRS and the moment at which the terminal device determines the QCL reference of the first channel is the shortest.

For example, it is assumed that the first configuration information includes configurations of two TRSs: a TRS 1 and a TRS 2. If the terminal device receives the first configuration information at a moment T0, receives the TRS 1 at a moment T0+2 ms, and receives the TRS 2 at a moment T0+5 ms, the first TRS is the TRS 1.

In another possible implementation, when the first configuration information includes configurations of a plurality of TRSs, the first TRS is a TRS, in measurement of the plurality of TRSs configured in the first configuration information, having a shortest time interval from a moment at which the terminal device determines the QCL reference of the first channel. That is, when receiving a plurality of TRSs, the terminal device needs to separately perform measurement, and each TRS has a start measurement moment. The first TRS is a TRS measured at a start measurement moment that is in the start measurement moments of the plurality of TRSs and that has a shortest time interval from the moment at which the terminal device determines the QCL reference of the first channel. That is, in the plurality of TRSs, a time interval between the start measurement moment of the first TRS and the moment at which the terminal device determines the QCL reference of the first channel is the shortest.

It should be understood that, in addition to the foregoing several manners of determining the first TRS in the plurality of TRSs, another manner may also be used to determine the first TRS in the plurality of TRSs. This is not limited in this embodiment of this application.

Figure 7:
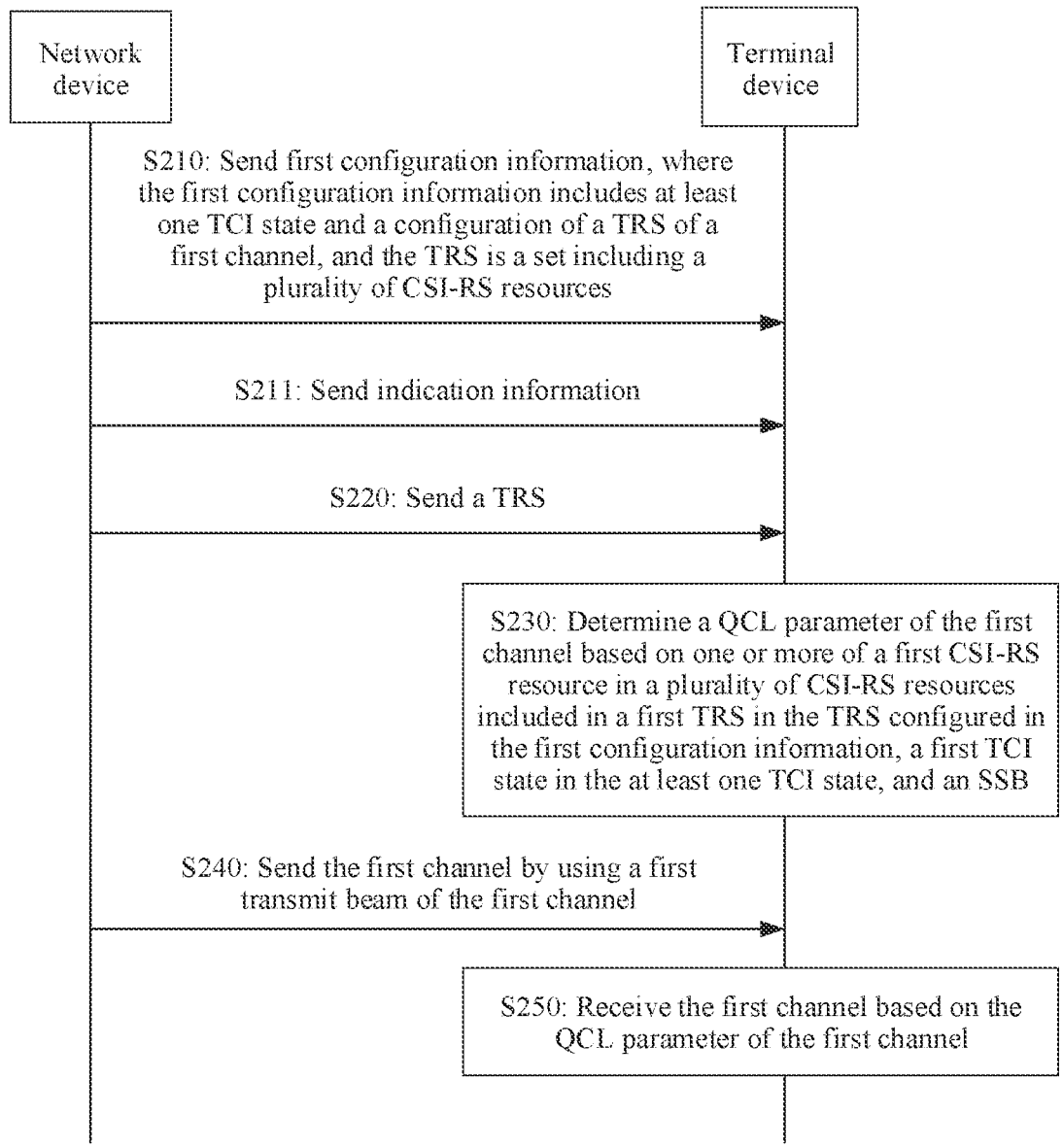
FIG. 7 is a schematic flowchart of a signal transmission method according to still another embodiment of this application.

Optionally, in an embodiment, FIG. 7 is a schematic flowchart, shown from a perspective of device interaction, of another embodiment of the signal transmission method 200. When the first configuration information includes the configurations of the plurality of TRSs, the method 200 further includes the following step.

S211: The network device sends indication information to the terminal device, where the indication information is used to indicate that one or more of the plurality of TRSs are activated TRSs, and the activated TRSs include the first TRS. Correspondingly, the terminal device receives the indication information.

Specifically, the network device may configure a plurality of TRSs for the terminal device. For example, currently, a maximum of 64 TRSs are specified in a protocol. If the network device does not indicate, to the terminal device, a specific TRS that is an activated TRS or a specific TRS that is not an activated TRS, the terminal device needs to track all configured TRSs. This leads to very high complexity and energy consumption of the terminal device. The activated TRS may be understood as a TRS that needs to be tracked by the terminal device. Therefore, after the network device configures the plurality of TRSs for the terminal device (the first configuration information includes the configurations of the plurality of TRSs), the network device may further send the indication information to the terminal device, to indicate that one or more of the plurality of TRSs configured in the first configuration information are activated TRSs. In a subsequent process in which the terminal device receives a TRS, the terminal device needs to track only the activated TRS based on the indication information. Optionally, before receiving an activation indication sent by the network device, the terminal device does not need to track the plurality of TRSs configured in the first configuration information.

For example, it is assumed that a TRS 1 to a TRS 64 are configured for the terminal device. In step S211, the terminal device receives the indication information, to indicate that the TRS 1 to the TRS 10 are activated TRSs. The terminal device needs to track only the TRS 1 to the TRS 10 based on the indication information. Then, the first TRS is determined in the TRS 1 to the TRS 10.

Optionally, in an implementation, before receiving the activation indication sent by the network device, the terminal device needs to track the plurality of TRSs configured in the first configuration information. After receiving the activation indication, the terminal needs to track only the activated TRS.

The TRS that needs to be detected is notified to the terminal device by sending the indication information to the terminal device, so that the terminal device can be prevented from detecting all the configured TRSs, the complexity and the power consumption of the terminal device are reduced, efficiency and accuracy of determining the first TRS by the terminal device are improved, and the communication efficiency is improved.

In an implementation, the indication information may be shown as a bitmap. It is assumed that a total of M TRSs are configured for the terminal device. In this case, an M-bit bitmap may be used to indicate a specific TRS that is activated, where 1 indicates that a TRS is activated, and 0 indicates that a TRS is not activated. Alternatively, 1 indicates that a TRS is not activated, and 0 indicates that a TRS is activated. It is assumed that there are N activated TRSs, and N $\{$rounding up $\log_2(M)\}$-bit fields may also be used to indicate N specific TRSs that are activated. Alternatively, another manner may be used to indicate a specific TRS that is activated. For example, MAC-CE signaling is used to indicate a specific TRS that is activated. It should be understood that a specific form of the indication information is not limited in this embodiment of this application.

Optionally, in an embodiment, when the first configuration information includes the configurations of the plurality of TRSs, each of the plurality of TRSs includes a first field, and the first field is used to indicate that the TRS is an activated TRS. For example, it is assumed that a total of 64 TRSs are configured for the terminal device, and the first configuration information is used to configure a TRS 1 to a TRS 10. Each of the TRS 1 to the TRS 10 includes a first field. The terminal device and the network device may predefine that the first field is used to indicate that the TRS is an activated TRS. Each of the TRS 11 to the TRS 64 does not include a first field. In step S220, the network device sends the TRS 1 to the TRS 30 to the terminal device. The terminal device detects the first field in the received TRSs, and tracks only TRSs that have the first field. That is, only the TRS 1 to the TRS 10 need to be tracked. Then, the first TRS is determined in the TRS 1 to the TRS 10. This reduces resource consumption of the terminal device, improves the efficiency and the accuracy of determining the first TRS by the terminal device, and improves the communication efficiency.

In an implementation, because the TRS is a CSI-RS resource set, and the CSI-RS resource set includes a trs-Info field, the first field may be 1-bit trs-Info change information. For example, when the first field is 1, it indicates that the CSI-RS resource set is an activated TRS, and when the first field is 0, it indicates that the CSI-RS resource set is an inactivated TRS.

It should be understood that in addition to the foregoing two manners of indicating an activated TRS, an activated TRS may alternatively be indicated in another manner. For example, the terminal device and the network device may predefine that a TRS is an activated TRS when a number of the TRS is one of some specific values, and the TRS is an inactivated TRS when the number of the TRS is one of some other specific values. In other words, a rule for distinguishing between an activated TRS and an inactivated TRS is predefined, and after the network device sends TRSs, the terminal device may determine, according to the predefined rule, a TRS that is an activated TRS and a TRS that is an inactivated TRS. This is not limited in this embodiment of this application.

Optionally, in an embodiment, when a TRS is activated, a QCL reference of the activated TRS may also be indicated. Because the TRS is a CSI-RS resource set, when the TRS is activated, a TCI state of each CSI-RS resource in the CSI-RS resource set may be activated by using an indication.

Optionally, in an embodiment, that the terminal device determines the QCL parameter of the first channel based on the first CSI-RS resource includes:

determining the QCL parameter of the first channel based on a reference signal resource included in a TCI state corresponding to the first CSI-RS resource.

Specifically, because a TRS is a CSI-RS resource set, the first CSI-RS resource may be a CSI-RS resource with a smallest number in the CSI-RS resources included in the first TRS. A corresponding TCI state is also required for receiving the first CSI-RS resource. To be specific, the terminal device may determine a receive beam of the first CSI-RS resource based on the TCI state corresponding to the first CSI-RS resource. It can be learned from the foregoing description of the TCI state that the TCI state may include QCL information (qcl-info), and the QCL information includes cell information, BWP information, reference signal information, and QCL type information (qcl-type). Therefore, the QCL parameter of the first channel is determined based on the reference signal resource included in the TCI state corresponding to the first CSI-RS resource. The reference signal resource may be reference signal information included in QCL information. For example, the reference signal resource included in the TCI state corresponding to the first CSI-RS resource may be a CSI-RS or an SSB.

Optionally, in an embodiment, the configuration of the TRS includes information about a component carrier CC or a bandwidth part BWP corresponding to the TRS.

Specifically, if a plurality of CCs and/or BWPs are configured for the terminal device, when one or more CCs and/or BWPs each have a configuration of a TRS and the TRS is used as a QCL reference, a specific CC and/or BWP whose TRS is the TRS configured in the first configuration information needs to be distinguished. For example, one CC may correspond to one or more TRSs, and different CCs may correspond to a same TRS or different TRSs. It is assumed that a CC 1 corresponds to a TRS 1 to a TRS 14, and a CC 2 also corresponds to the TRS 1 to the TRS 14. In this case, a configuration of each TRS should include information about a CC corresponding to the TRS, so that a specific CC on which the TRS is located can be distinguished. In addition, the first TRS may be further determined with reference to information about a CC/BWP. For example, the first TRS may be a TRS corresponding to a CC/BWP (active BWP) currently used by the terminal device. Alternatively, the first TRS may be a TRS of an initial BWP in which the terminal device performs initial access. Alternatively, the first TRS may be a TRS of a predefined CC/BWP. Alternatively, the first TRS may be a TRS of a CC/BWP with a smallest or largest CC index (index)/BWP index. This is not limited in this application.

Figure 8A:
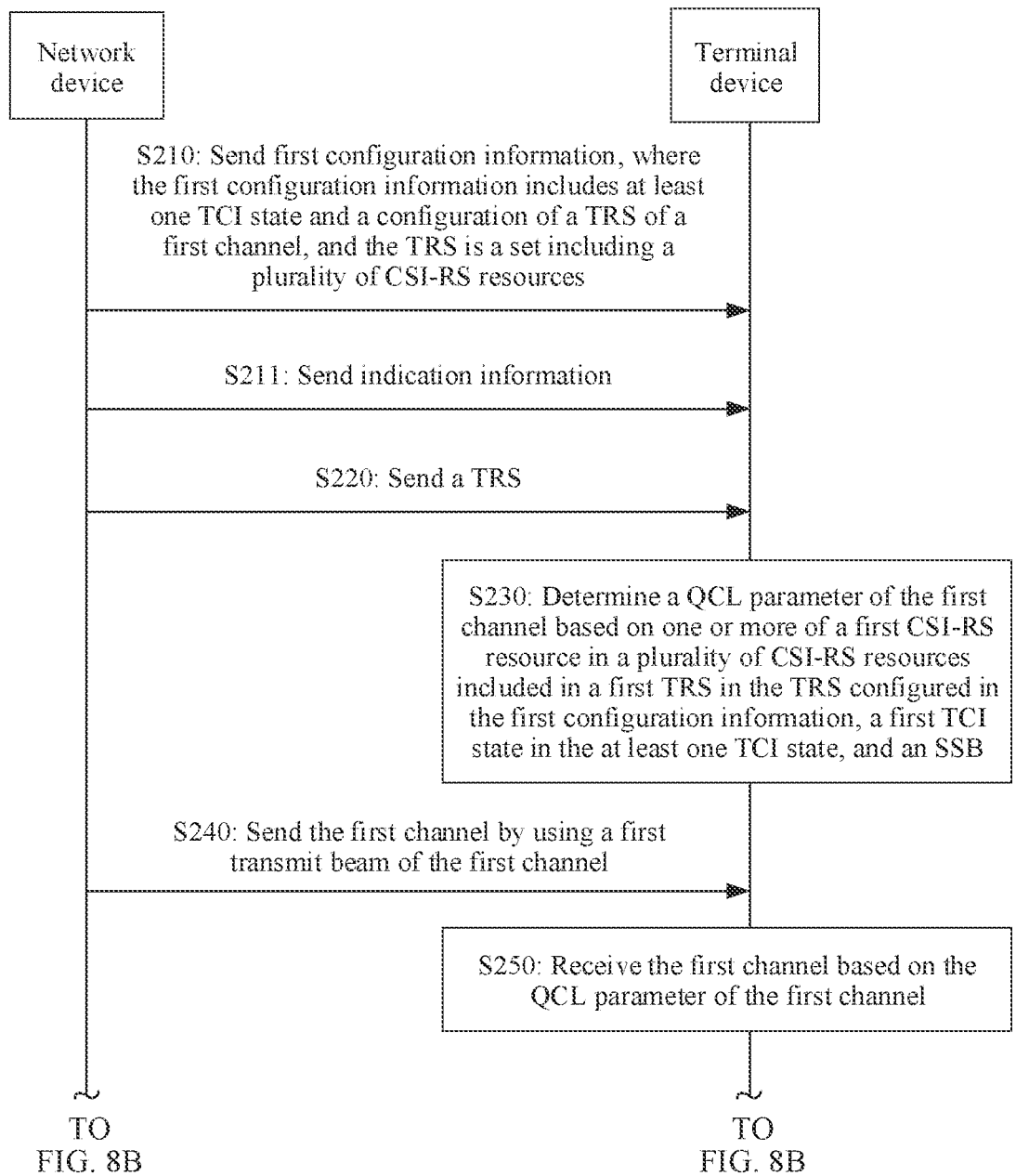
FIG. 8A and FIG. 8B are a schematic flowchart of a signal transmission method according to another embodiment of this application.
Figure 8B:
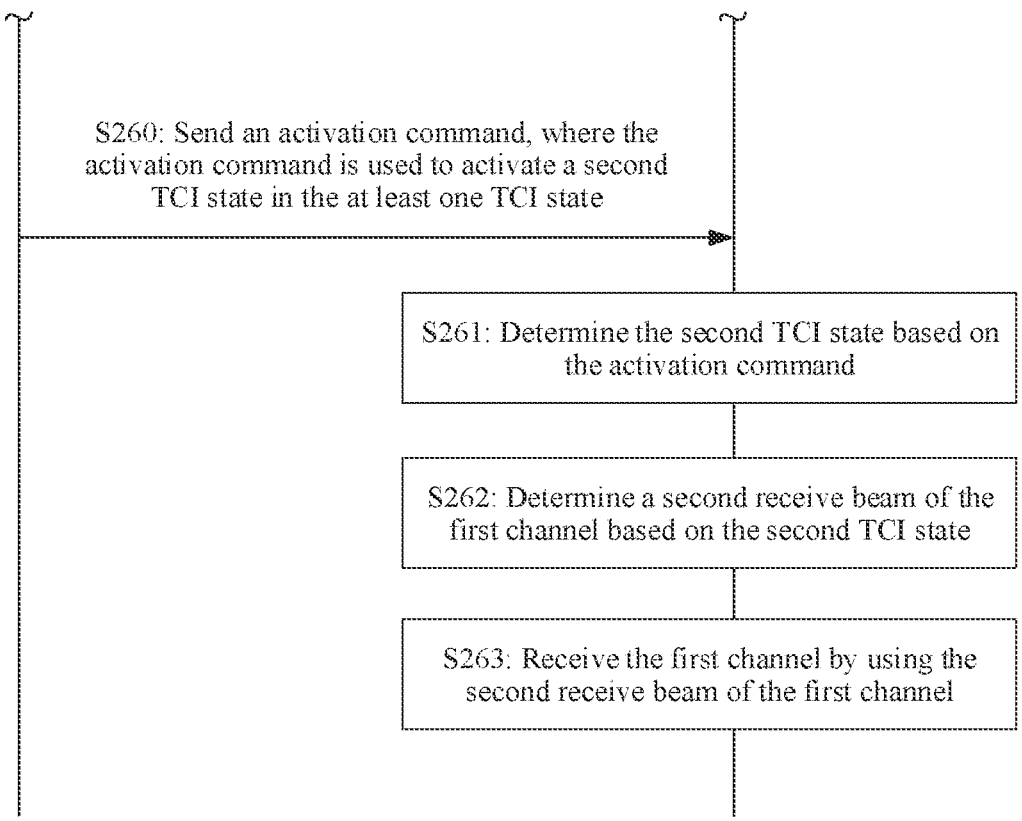

Optionally, in an embodiment, FIG. 8A and FIG. 8B are a schematic flowchart, shown from a perspective of device interaction, of another embodiment of the signal transmission method 200. The method 200 further includes the following steps.

S260: The network device sends an activation command to the terminal device, where the activation command is used to activate a second TC state in the at least one TCI state. Correspondingly, the terminal device receives the activation command.

S261: The terminal device determines the second TC state based on the activation command.

S262: The terminal device determines a second receive beam of the first channel based on the second TC state.

S263: The terminal device receives the first channel by using the second receive beam of the first channel.

Specifically, after receiving the activation command, the terminal device determines the second TCI state based on the activation command. In other words, the network device indicates the activated second TC state in the at least one TCI state to the terminal device, and the terminal device may determine the second receive beam of the first channel based on the activated second TCI state. The first channel is received by using the second receive beam of the first channel. The activation command may be a MAC-CE. It should be understood that, if the second TC state includes a plurality of TCI states, the network device may further indicate a selected TCI state in the second TC state by using a TC field in physical layer signaling (for example, DCI).

Figure 9A:
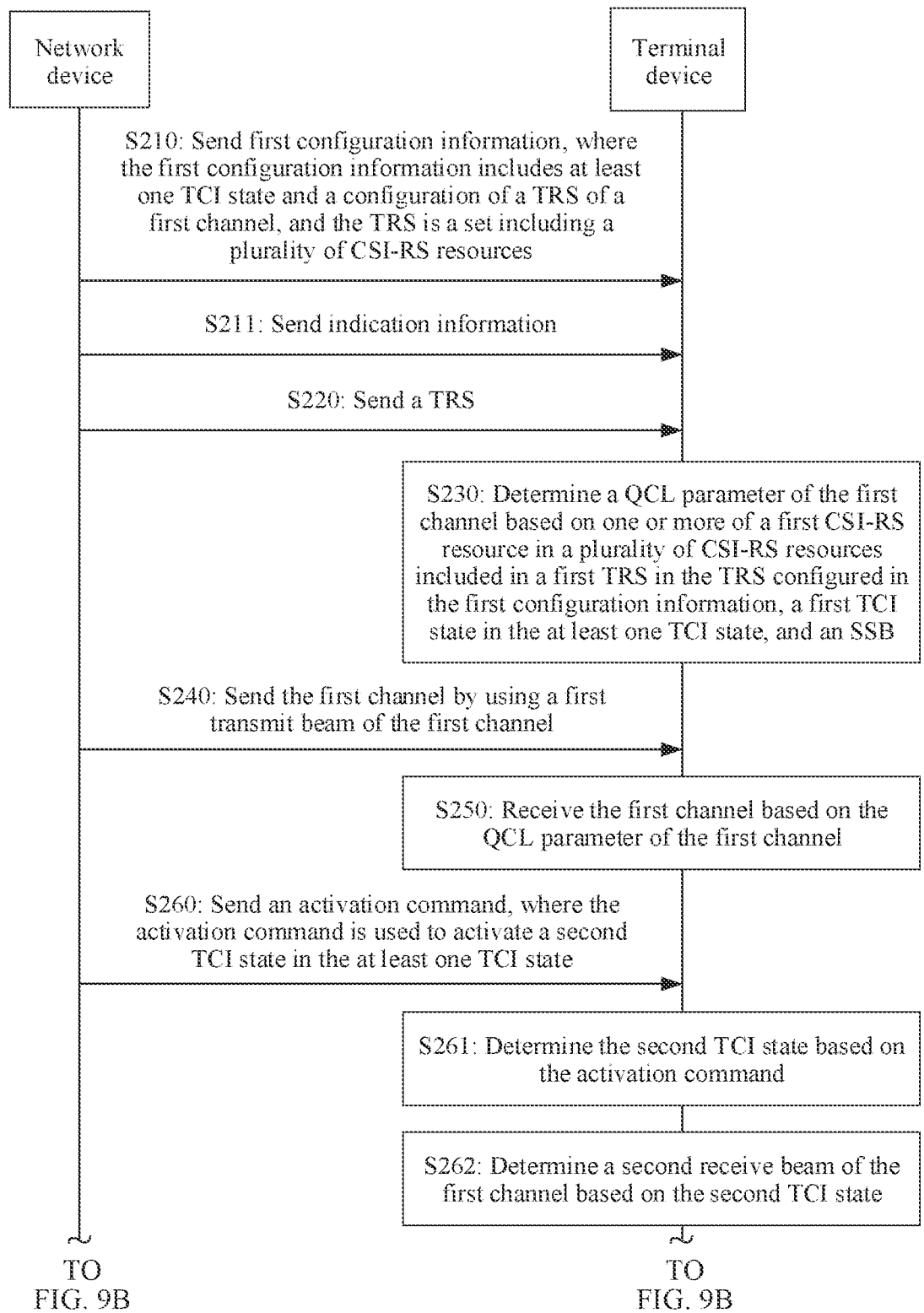
FIG. 9A and FIG. 9B are a schematic flowchart of a signal transmission method according to still another embodiment of this application.
Figure 9B:
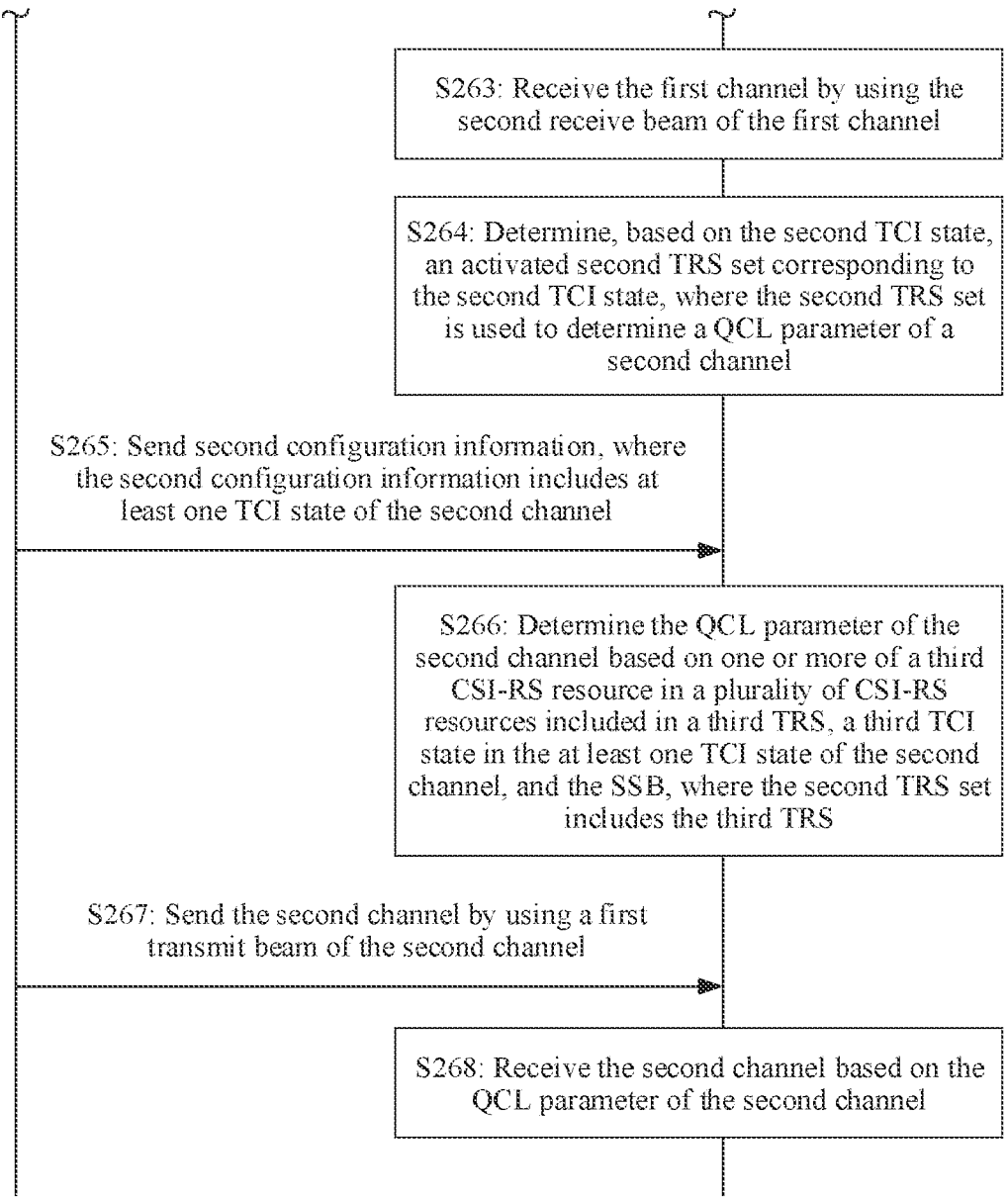

Optionally, in an embodiment, FIG. 9A and FIG. 9B are a schematic flowchart, shown from a perspective of device interaction, of another embodiment of the signal transmission method 200. The method 20 further includes the following steps.

S264: The terminal device determines, based on the second TCI state, an activated second TRS set corresponding to the second TCI state, where the second TRS set is used to determine a QCL parameter of a second channel.

S265: The network device sends second configuration information to the terminal device, where the second configuration information includes at least one TCI state of the second channel; and correspondingly, the terminal device receives the configuration information.

S266: The terminal device determines the QCL parameter of the second channel based on one or more of a third CSI-RS resource in a plurality of CSI-RS resources included in a third TRS, a third TCI state in the at least one TCI state of the second channel, and the SSB, where the second TRS set includes the third TRS.

S267: The network device sends the second channel by using a first transmit beam of the second channel.

S268: The terminal device receives the second channel based on the QCL parameter of the second channel.

Specifically, an example in which the activation command is a MAC-CE is used for description. FIG. 10 is a schematic diagram of a format of a MAC-CE. As shown in FIG. 10, an octet (Oct, octet) represents a byte formed by eight bits, and R represents a placeholder. The MAC-CE is used to configure a TCI state for a first channel (for example, a PDSCH, a PUSCH, or a PDCCH) in an indicated serving cell. The MAC-CE is used to select, based on a bitmap, one or more of a plurality of TCI states configured for the terminal device for activation.

Specifically, the MAC-CE includes an identifier (ID) of the serving cell, an ID of a BWP, and an indication bit used to indicate whether a TCI state is activated. An activated TC state indicated by the MAC-CE may be understood as a TCI state configured based on the serving cell and the BWP that are indicated by the MAC-CE. In other words, when the PDSCH, the PUSCH, or the PDCCH is transmitted in the BWP in the serving cell, a transmit beam and a receive beam may be determined based on information indicated by the TCI state. $T_i$ in the MAC-CE is used to indicate whether a TCI state is activated. Each T may occupy one bit, and i corresponds to an $i^{th}$ TCI state in a TCI state list configured by using a tci-StatesToAddModList in an RRC message. For example, i is equal to a value of a TC state ID. A value of $T_1$ may be 1 or 0. The value 1 may indicate that the TC state is selected for activation, and the value 0 may indicate that the TC state is not selected for activation. For example, a value of $T_6$ is 1, indicating that a TCI state 6 is activated. In step S264, the terminal device determines, based on the second TCI state, the activated second TRS set corresponding to the second TCI state, where the second TRS set may include one or more TRSs. The second TRS set is used to determine the QCL parameter of the second channel. It is assumed that eight TCI states are activated based on the activation command. That is, the second TC state includes eight TCI states. In this case, the second TRS set includes eight TRSs. The activated second TRS set corresponding to the second TCI state may be understood as: The second TC state is the same as a TCI state of a TRS (a direction of a beam determined based on the second TC state is the same as a direction of a beam of the TRS), that is, the TCI state of the TRS is the second TCI state, so that the TRS is a TRS in the second TRS set. Alternatively, a reference signal included in the second TC state is the same as or has a quasi-colocation relationship with a reference signal included in the TC state of the TRS. It is assumed that one TCI state is activated based on the activation command. That is, the second TC state includes one TCI state. In this case, the second TRS set includes only one TRS, and the TRS is an activated TRS. For example, it is assumed that the second TC state includes one TCI state, that is, a TCI state 8, and a TRS corresponding to the TC state 8 is also activated. The second TRS set is used to determine the QCL parameter of the second channel.

In an implementation, the terminal device tracks the activated TRS based on the second TCI state that is activated based on the activation command. In this implementation, a TC state may not be explicitly configured for the activated TRS, or a TCI state configured for the activated TRS is replaced by an activated TCI state. The TRS is a CSI-RS resource set, that is, a TC state is not explicitly configured for a CSI-RS resource in the activated CSI-RS resource set, or a TC state configured for the CSI-RS resource is replaced by an activated TCI state. If eight TC states are activated, the eight TC states may be respectively used as QCL references of eight TRSs in a predetermined sequence, for example, in ascending or descending order of TCI numbers.

Further, the terminal device may feed back, to the network device, a maximum quantity of activated TCI states and a maximum quantity of activated TRSs that are supported by the terminal device. The maximum quantity of activated TC states needs to be less than or equal to the maximum quantity of activated TRSs. In this way, it can be ensured that each activated TCI (beam) can have a corresponding TRS for a time-frequency tracking function.

In step S265, the network device sends the second configuration information to the terminal device, where the second configuration information includes the at least one TCI state of the second channel; and correspondingly, the terminal device receives the second configuration information.

In step S266, the terminal device determines the QCL parameter of the second channel based on one or more of the third CS-RS resource in the plurality of CSI-RS resources included in the third TRS, the third TCI state in the at least one TCI state of the second channel, and the SSB, where the second TRS set includes the third TRS.

In step S267, the network device sends the second channel by using the first transmit beam of the second channel.

In step S268, the terminal device determines the first receive beam of the second channel based on the QCL parameter of the second channel, and then receives the second channel on the first receive beam of the second channel.

It should be understood that for the foregoing step S265 to step S268, refer to the descriptions of step S230 to step S250. For example, a specific process in which the terminal device determines the third TRS in the second TRS set is similar to a process in which the terminal device determines the first TRS in the plurality of TRSs configured in the first configuration information. A process in which the terminal device receives the second channel based on the QCL parameter of the second channel is similar to a process in which the terminal device receives the first channel based on the QCL parameter of the first channel. For specific descriptions, refer to the foregoing specific descriptions of the process of receiving the first channel. For brevity, details are not described herein again.

After the foregoing step S268, the network device may further send, to the terminal device, an activation command specific to the at least one TC state of the second channel, and the terminal device may determine a second receive beam of the second channel based on the activation command. The second channel is received by using the second receive beam of the second channel. That is, this step is similar to the foregoing steps S260 to S263. For brevity, details are not described herein again.

According to the signal transmission method provided in this application, when the terminal device needs to receive the second channel, the TRS determined based on the activation command of the TCI state of the first channel may still be used as a QCL reference for receiving the second channel, or the third TCI state in the at least one TCI state of the second channel is used as a QCL reference for receiving the second channel, or the SSB is used as a QCL reference for receiving the second channel. This can improve the accuracy of the QCL assumption, so that the terminal device receives the second channel on a more accurate beam; and improve efficiency of receiving and demodulation of the second channel. Because the TRS previously determined based on the activation command of the TCI state of the first channel is used, the second configuration information may not include configuration information of the TRS, thereby reducing signaling overheads and a waste of resources, and further saving resources. This improves the communication efficiency and the user experience.

In an embodiment, the first channel is a PDCCH or a PDSCH. The second channel is a PDCCH or a PDSCH. It should be understood that the first channel and/or the second channel may alternatively be another channel. This is not limited in this application.

It should be understood that the terminal device may further determine a default QCL reference of another downlink signal by using a method similar to the foregoing method. For example, the downlink signal may be a CSI-RS. For example, the terminal device uses a TRS, an SSB, or a first TCI state in a plurality of TC states of the CSI-RS as a default QCL reference of the CSI-RS. The downlink signal may alternatively be another downlink signal. This is not limited in this application.

It should be further understood that the terminal device may further determine a default QCL reference of an uplink signal or an uplink channel by using a method similar to the foregoing method. For example, the terminal device may use a TRS, an SSB, or a first TC state in a plurality of TCI states as a default transmit beam (spatial relationship, or spatial domain filter) reference of the uplink signal or the uplink channel. The uplink signal may be an SRS, and the uplink channel may be a physical uplink control channel (PUCCH) or a physical uplink shared channel (PUSCH). For example, the terminal device may use a TRS, an SSB, or a first TC state in a plurality of TC states as a default transmit beam reference of the SRS. This is not limited in this application.

Currently, a protocol specifies a position at which a TRS appears in time domain. Specifically, the TRS may appear on the following symbols in each slot.

For a frequency range 1 and a frequency range 2 (frequency range 1 and frequency range 2), the TRS may appear on the following symbols: (4, 8), (5, 9), or (6, 10).

For the frequency range 2, the TRS may appear on the following symbols: (0, 4), (1, 5), (2, 6), (3, 7), (7, 11), (8, 12), or (9, 13).

The foregoing numbers represent sequence numbers of symbols in a slot. In addition, because a TRS is a CS-RS resource set, it may be understood that one CS-RS resource is transmitted on each of the foregoing symbols. In addition, all CSI-RS resources in the set have a QCL relationship. That is, TCI states of all CSI-RS resources included in a TRS need to be the same. That is, the terminal device needs to receive, on a same beam, all CSI-RS resources included in a TRS.

It should be understood that, in the embodiments of this application, a symbol is also referred to as a time domain symbol, and may be an orthogonal frequency division multiplexing (OFDM) symbol or a single carrier frequency division multiple access (SC-FDMA) symbol, where SC-FDMA is also referred to as orthogonal frequency division multiplexing with transform precoding (OFDM with TP).

Figure 11:
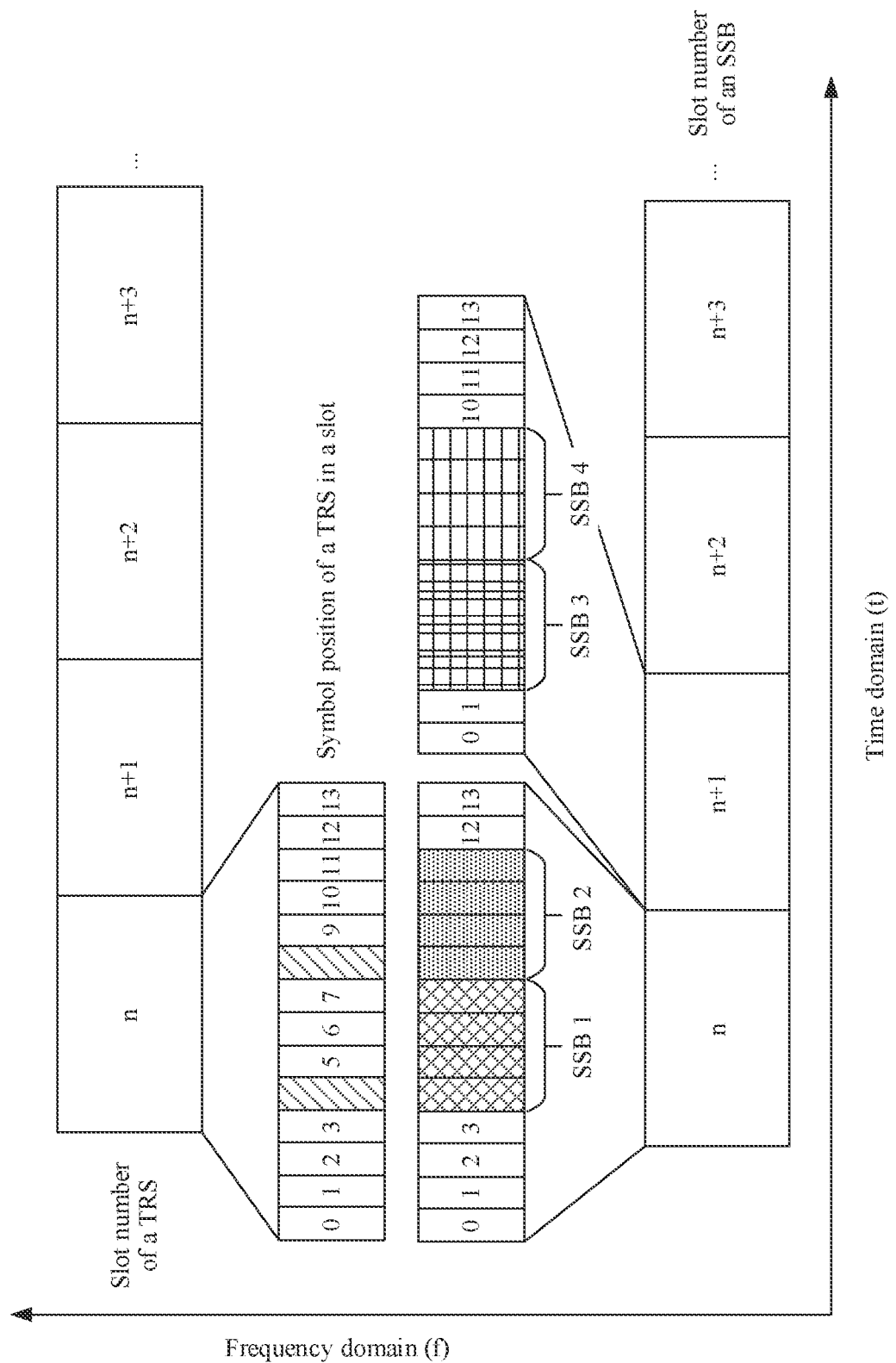
FIG. 11 is a schematic diagram of a time domain position of a TRS and a time domain position of an SSB.

A current protocol specifies that one SSB includes four consecutive OFDM symbols, and two SSBs are transmitted in each slot. Possible time domain positions of the two SSBs are respectively the second symbol to the fifth symbol and the sixth symbol to the ninth symbol. Alternatively, possible time domain positions of the two SSBs are respectively the fourth symbol to the seventh symbol and the eighth symbol to the eleventh symbol. A TRS appears on two symbols at an interval of three symbols, that is, a time span of one TRS is five OFDM symbols. In addition, two adjacent SSBs need to have different QCL information, but CSI-RS resources included in a TRS need to have same QCL information. The same QCL information means a same beam. For example, transmit beams or receive beams are the same. Consequently, a time configuration of a TRS in the current technology may cause a conflict between the TRS and an SSB, thereby affecting performance. For example, FIG. 11 is a schematic diagram of a time domain position of a CSI-RS resource included in a TRS and a time domain position of an SSB. The TRS includes two CSI-RS resources, and the two CSI-RS resources are respectively transmitted on the fourth symbol and the eighth symbol in an $n^{th}$ slot. An SSB 1 occupies the fourth symbol to the seventh symbol, and an SSB 2 occupies the eighth symbol to the eleventh symbol. The fourth symbol and the eighth symbol need to have consistent QCL information (beam information, for example, including a direction of a receive beam and a direction of a transmit beam) because CSI-RS resources on the two symbols belong to a same TRS. The SSB 1 and the SSB 2 have different QCL information (beam information). The terminal device can simultaneously receive only one beam. The simultaneously receiving only one beam may be understood as: receiving only one beam at a same moment (for example, on a same symbol). Simultaneous receiving includes: A receive end (for example, the terminal device) receives a plurality of signals on one receive parameter (a QCL parameter, which may also be understood as a same beam) at a same moment, and also includes: simultaneously receiving a plurality of signals on a plurality of different receive beams (different receive parameters). If it is assumed that the CSI-RS resource on the fourth symbol and the SSB 1 have same QCL information (have at least a same direction of a receive beam), the CSI-RS resource on the eighth symbol and the SSB 2 have different QCL information, where different QCL information indicates different receive beams of the terminal device, but the terminal device can receive only one beam at a same moment. In this case, the terminal device cannot receive, on the eighth symbol, the CSI-RS resource or the SSB 2. Consequently, a receiving problem occurs, and receiving of the SSB 2 or receiving of the CSI-RS resource on the eighth symbol is affected. This further affects performance of the terminal device.

Therefore, this application further provides a signal transmission method. This can avoid a problem of a conflict between transmission of the TRS and transmission of the SSB, ensure reliability of the transmission of the TRS and the transmission of the SSB, and improve the communication efficiency.

The following describes the embodiments of this application in detail with reference to the accompanying drawings.

Figure 12:
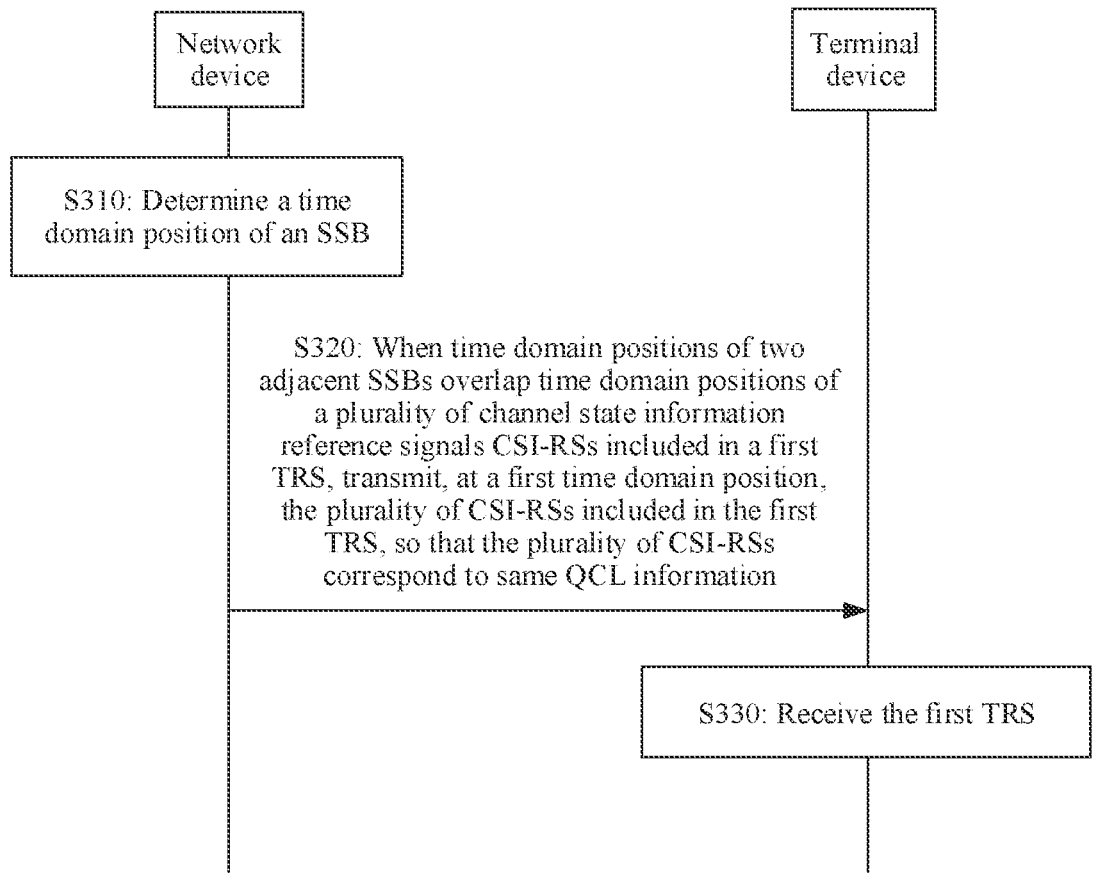
FIG. 12 is a schematic flowchart of a signal transmission method according to an embodiment of this application.

FIG. 12 is a schematic flowchart, shown from a perspective of device interaction, of a signal transmission method 300. As shown in FIG. 12, the method 300 shown in FIG. 12 may include step S310 to step S330. The following describes steps in the method 300 in detail with reference to FIG. 12.

It should be understood that in this embodiment of this application, the method 300 is described by using an example in which the method 300 is performed by a terminal device and a network device. By way of example, and not limitation, the method 300 may alternatively be performed by a chip used in a terminal device and a chip used in a network device.

S310: The network device determines a time domain position of an SSB.

S320: When time domain positions of two adjacent SSBs overlap time domain positions of a plurality of channel state information reference signals CSI-RSs included in a first tracking reference signal TRS, the network device transmits, at a first time domain position, the plurality of CSI-RSs included in the first TRS, so that the plurality of CSI-RSs correspond to same QCL information, where the two adjacent SSBs correspond to different QCL information, and the first TRS is a set including a plurality of channel state information reference signal CSI-RS resources. The first TRS may be any TRS sent by the network device.

S330: The terminal device receives the first TRS at the first time domain position.

Specifically, descriptions are provided with reference to FIG. 11. The first TRS includes two CSI-RS resources, and the two CSI-RS resources are respectively transmitted on the fourth symbol and the eighth symbol in an $n^{th}$ slot. The first TRS may be any TRS. An SSB 1 occupies the fourth symbol to the seventh symbol, and an SSB 2 occupies the eighth symbol to the eleventh symbol. The SSB 1 and the SSB 2 are two adjacent SSBs. If transmission is performed based on current time domain positions, a receiving problem of the terminal device occurs. Therefore, the network device sends, at the first time domain position, the plurality of channel state information reference signals CSI-RSs included in the first TRS. So that the two CSI-RSs have same corresponding QCL information. Therefore, the terminal device can correctly receive the first TRS, and accuracy of receiving the TRS by the terminal device is improved. This improves a communication quality.

In an implementation, the first time domain position of the first TRS includes the second symbol and the fifth symbol, or the fourth symbol and the seventh symbol, or the sixth symbol and the ninth symbol, or the eighth symbol and the eleventh symbol in the first slot. The first slot may be any slot for transmitting a TRS. That is, a time domain TRS mapping is newly added, and one CSI-RS is transmitted every three symbols. Descriptions are provided with reference to FIG. 11. It is assumed that an SSB 1 occupies the fourth symbol to the seventh symbol, and an SSB 2 occupies the eighth symbol to the eleventh symbol. The first TRS includes two CSI-RS resources. The first CSI-RS is transmitted on the second symbol, and the second CSI-RS is transmitted on the fifth symbol. Possible time domain positions of the two SSBs are respectively the second symbol to the fifth symbol and the sixth symbol to the ninth symbol. Alternatively, possible time domain positions of the two SSBs are respectively the fourth symbol to the seventh symbol and the eighth symbol to the eleventh symbol. Therefore, regardless of the case of the time domain positions of the two SSBs, it can be ensured that the two CS-RSs included in the first TRS are transmitted on a same beam as the SSB. That is, QCL information of the two CSI-RS resources included in the first TRS does not conflict with QCL information of the two SSBs. This ensures correct signal receiving of the terminal device.

It should be understood that the first time domain position may alternatively include another symbol, provided that the QCL information of the TRS does not conflict with the QCL information of the SSB when the TRS is transmitted on the symbol. This is not limited in this embodiment of this application.

In another implementation, when the time domain position of the SSB conflicts with the time domain position of the TRS, the time domain position of the TRS may be shifted, and the TRS is transmitted on a time domain position obtained after shift. For example, descriptions are provided with reference to FIG. 11. To avoid an SSB 2 on the eighth symbol, a time domain position of the second CSI-RS may be shifted forward to the seventh symbol for transmission, or may be shifted backward to the twelfth symbol for transmission. The network device and the terminal device need to agree on a specific shift direction in advance. The specific shift direction and a quantity of symbols crossed in shift may be predefined in a protocol or configured by the network device. This can also ensure that the two CSI-RSs included in the first TRS are transmitted on a same beam as the SSB at a same moment. QCL information of the two CSI-RS resources included in the first TRS does not conflict with QCL information of the two SSBs. This ensures correct signal receiving of the terminal device.

In another implementation, the first time domain position does not overlap the time domain positions of the two adjacent SSBs. In other words, the TRS is not mapped to a resource on which the SSB is located. In this way, a conflict between the SSB and the TRS can also be avoided.

It should be understood that division of manners, cases, types, and embodiments in the embodiments of this application are merely for ease of description, but should not constitute any special limitation, and features in various manners, types, cases, and embodiments may be combined when there is no contradiction.

It should be further understood that, in the embodiments of this application, "first", "second", and the like are merely intended to indicate that a plurality of objects are different. For example, "the first TCI state" and "the second TCI state" are merely intended to indicate different TCI states, but should not cause any impact on the TCI states. The foregoing "first", "second", and the like should not cause any limitation on the embodiments of this application.

It should be further understood that the foregoing descriptions are merely intended to help a person skilled in the art better understand the embodiments of this application, but are not intended to limit the scope of the embodiments of this application. It is clear that a person skilled in the art may make various equivalent modifications or changes based on the foregoing examples. For example, some steps in the foregoing method 200 and method 300 may be unnecessary, or some steps may be newly added. Alternatively, any two or more of the foregoing embodiments may be combined. Such a modified, changed, or combined solution also falls within the scope of the embodiments of this application.

It should be further understood that, the foregoing descriptions of the embodiments of this application focus on a difference between the embodiments. For same or similar parts that are not mentioned, refer to each other. For brevity, details are not described herein again.

It should be further understood that sequence numbers of the foregoing processes do not mean execution sequences. The execution sequences of the processes should be determined based on functions and internal logic of the processes, and should not be construed as any limitation on the implementation processes of the embodiments of this application.

It should be further understood that in the embodiments of this application, "presetting" and "predefinition" may be implemented by prestoring, in a device (including, for example, a terminal device and a network device), corresponding code, a corresponding table, or another manner that may be used to indicate related information. A specific implementation is not limited in this application.

It should be further understood that in the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

The foregoing describes in detail an example of the signal transmission method provided in this application. It may be understood that, to implement the foregoing functions, the terminal device and the network device each include a corresponding hardware structure and/or software module for performing each function. A person skilled in the art should easily be aware that, in combination with units and algorithm steps of the examples described in the embodiments disclosed in this application, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

The following describes a communications apparatus according to this application.

Figure 13:
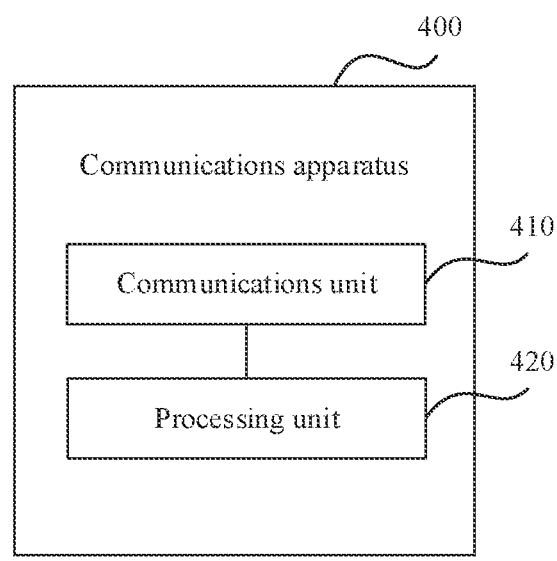
FIG. 13 is a schematic block diagram of a communications apparatus according to an embodiment of this application.

FIG. 13 is a schematic structural diagram of a communications apparatus according to this application. The communications apparatus 400 includes a communications unit 410 and a processing unit 420.

The communications unit 410 is configured to receive first configuration information, where the first configuration information includes at least one transmission configuration indicator TCI state and a configuration of a tracking reference signal TRS of a first channel, and the TRS is a set including a plurality of channel state information reference signal CS-RS resources.

The processing unit 420 is configured to determine a quasi-colocation QCL parameter of the first channel based on one or more of a first CS-RS resource in a plurality of CSI-RS resources included in a first TRS in the TRS, a first TCI state in the at least one TCI state, and a synchronization signal and PBCH block SSB.

The communications unit 410 is further configured to receive the first channel based on the QCL parameter of the first channel.

Optionally, the communications unit 410 may include a receiving unit (module) and a sending unit (module), which are configured to perform the method 200 and the steps of receiving and sending information by the terminal device in FIG. 2 to FIG. 9B. Optionally, the communications apparatus 400 may further include a storage unit, configured to store instructions executed by the communications unit 410 and the processing unit 420.

The communications apparatus 400 is a communications device, or may be a chip in a communications device. When the communications apparatus is the communications device, the processing unit may be a processor, and the communications unit may be a transceiver or a transceiver unit. The communications device may further include a storage unit, and the storage unit may be a memory. The storage unit is configured to store an instruction, and the processing unit executes the instruction stored in the storage unit, so that the communications device performs the foregoing method. When the communications apparatus is the chip in the communications device, the processing unit may be a processor, the transceiver unit may be an input/output interface, a pin, a circuit, or the like. The processing unit executes an instruction stored in a storage unit, so that the communications apparatus performs an operation performed by the terminal device in the foregoing method 200. The storage unit may be a storage unit (for example, a register or a cache) in the chip, or may be a storage unit (for example, a read-only memory or a random access memory) outside the chip in the communications device.

It may be clearly understood by a person skilled in the art that, for steps performed by the communications apparatus 400 and corresponding beneficial effects, refer to related descriptions of the terminal device in the foregoing method 20. For brevity, details are not described herein again.

Figure 14:
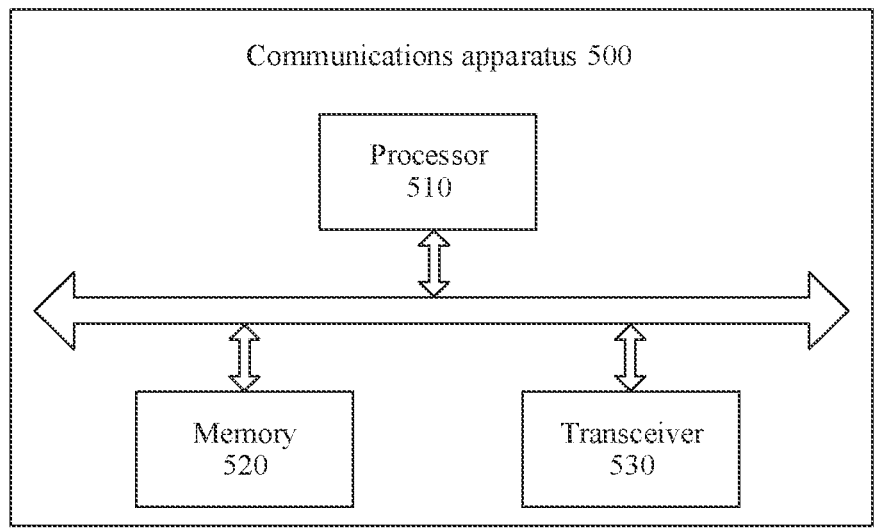
FIG. 14 is a schematic block diagram of a communications apparatus according to another embodiment of this application.

It should be understood that, the communications unit 410 may be implemented by a transceiver, and the processing unit 420 may be implemented by a processor. The storage unit may be implemented by a memory. As shown in FIG. 14, a communications apparatus 500 may include a processor 510, a memory 520, and a transceiver 530.

The communications apparatus 400 shown in FIG. 13 or the communications apparatus 500 shown in FIG. 14 can implement the method 200 and the steps performed by the terminal device in FIG. 2 to FIG. 9B. For similar descriptions, refer to the descriptions in the corresponding method. To avoid repetition, details are not described herein again.

Figure 15:
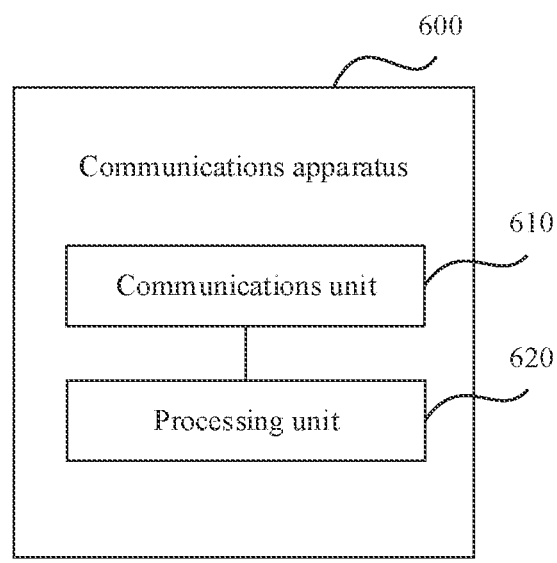
FIG. 15 is a schematic block diagram of a communications apparatus according to still another embodiment of this application.

FIG. 15 is a schematic structural diagram of a communications apparatus according to this application. The communications apparatus 600 includes a communications unit 610 and a processing unit 620.

The communications unit 610 is configured to send first configuration information, where the first configuration information includes at least one transmission configuration indicator TCI state and a configuration of a tracking reference signal TRS of a first channel, and the TRS is a set including a plurality of channel state information reference signal CSI-RS resources.

The communications unit 610 is further configured to send the first channel by using a first transmit beam of the first channel.

Optionally, the communications unit 610 may include a receiving unit (module) and a sending unit (module), which are configured to perform the method 200 and the steps of receiving and sending information by the network device in FIG. 2 to FIG. 9B. Optionally, the communications apparatus 600 may further include a storage unit, configured to store instructions executed by the communications unit 610 and the processing unit 620.

The communications apparatus 600 is a communications device, or may be a chip in a communications device. When the communications apparatus is the communications device, the processing unit may be a processor, and the communications unit may be a transceiver or a transceiver unit. The communications device may further include a storage unit, and the storage unit may be a memory. The storage unit is configured to store an instruction, and the processing unit executes the instruction stored in the storage unit, so that the communications device performs the foregoing method. When the apparatus is the chip in the communications device, the processing unit may be a processor, the transceiver unit may be an input/output interface, a pin, a circuit, or the like. The processing unit executes an instruction stored in a storage unit, so that the communications apparatus performs an operation performed by the network device in the foregoing method 200. The storage unit may be a storage unit (for example, a register or a cache) in the chip, or may be a storage unit (for example, a read-only memory or a random access memory) outside the chip in the communications device.

It may be clearly understood by a person skilled in the art that, for steps performed by the communications apparatus 600 and corresponding beneficial effects, refer to related descriptions of the network device in the foregoing method 200. For brevity, details are not described herein again.

Figure 16:
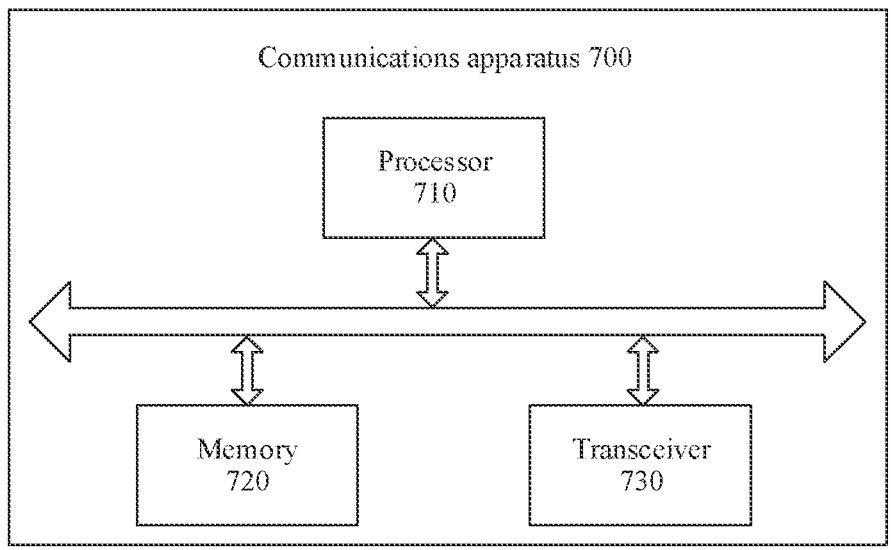
FIG. 16 is a schematic block diagram of a communications apparatus according to another embodiment of this application.

It should be understood that, the communications unit 610 may be implemented by a transceiver, and the processing unit 620 may be implemented by a processor. The storage unit may be implemented by a memory. As shown in FIG. 16, a communications apparatus 700 may include a processor 710, a memory 720, and a transceiver 730.

The communications apparatus 600 shown in FIG. 15 or the communications apparatus 700 shown in FIG. 16 can implement the method 200 and the steps performed by the network device in FIG. 2 to FIG. 9B. For similar descriptions, refer to the descriptions in the corresponding method. To avoid repetition, details are not described herein again.

Figure 17:
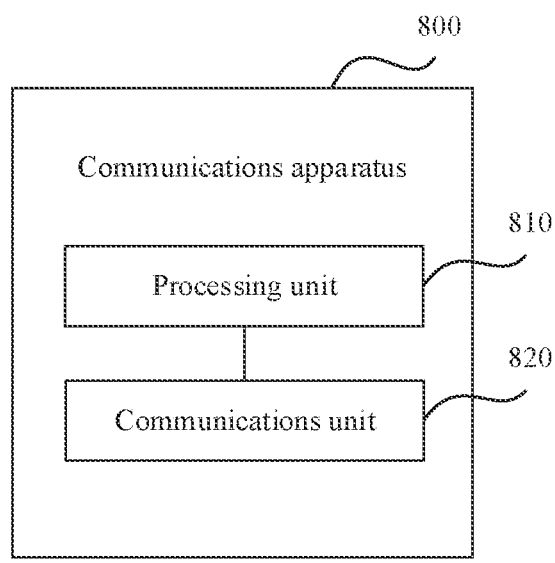
FIG. 17 is a schematic block diagram of a communications apparatus according to still another embodiment of this application.

FIG. 17 is a schematic structural diagram of a communications apparatus according to this application. The communications apparatus 800 includes a processing unit 810 and a communications unit 820.

The processing unit 810 is configured to determine a time domain position of a synchronization signal and PBCH block SSB.

The communications unit 820 is configured to; when time domain positions of two adjacent SSBs overlap time domain positions of a plurality of channel state information reference signals CSI-RSs included in a first tracking reference signal TRS, transmit, at a first time domain position, the plurality of CSI-RSs included in the first TRS, so that the plurality of CSI-RSs correspond to same quasi-colocation QCL information, where the two adjacent SSBs correspond to different QCL information, and the first TRS is a set including a plurality of channel state information reference signal CSI-RS resources.

The communications apparatus 800 is a communications device, or may be a chip in a communications device. When the communications apparatus is the communications device, the processing unit may be a processor, and the communications unit may be a transceiver or a transceiver unit. The communications device may further include a storage unit, and the storage unit may be a memory. The storage unit is configured to store an instruction, and the processing unit executes the instruction stored in the storage unit, so that the communications device performs the foregoing method. When the apparatus is the chip in the communications device, the processing unit may be a processor, the transceiver unit may be an input/output interface, a pin, a circuit, or the like. The processing unit executes an instruction stored in a storage unit, so that the communications apparatus performs an operation performed by the network device in the foregoing method 300. The storage unit may be a storage unit (for example, a register or a cache) in the chip, or may be a storage unit (for example, a read-only memory or a random access memory) outside the chip in the communications device.

Optionally, the communications unit 810 may include a receiving unit (module) and a sending unit (module), which are configured to perform the method 300 and the steps of receiving and sending information by the network device in FIG. 12. Optionally, the communications apparatus 800 may further include a storage unit, configured to store instructions executed by the communications unit 810 and the processing unit 820.

Figure 18:
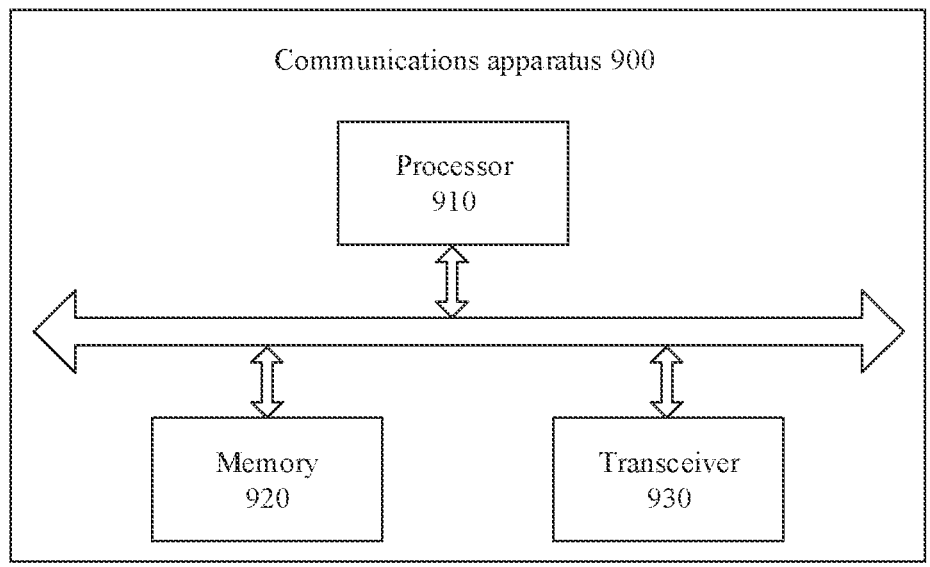
FIG. 18 is a schematic block diagram of a communications apparatus according to still another embodiment of this application.

It should be understood that, the communications unit 810 may be implemented by a transceiver, and the processing unit 820 may be implemented by a processor. The storage unit may be implemented by a memory. As shown in FIG. 18, a communications apparatus 900 may include a processor 910, a memory 920, and a transceiver 930.

The communications apparatus 800 shown in FIG. 17 or the communications apparatus 900 shown in FIG. 18 can implement the method 300 and the steps performed by the network device in FIG. 12. For similar descriptions, refer to the descriptions in the corresponding method. To avoid repetition, details are not described herein again.

The network device and the terminal device in the foregoing apparatus embodiments completely correspond to the network device and the terminal device in the method embodiments. A corresponding module or unit performs a corresponding step. For example, the transceiver unit (transceiver) performs a sending step and/or a receiving step in the method embodiments, and another step other than the sending step and the receiving step may be performed by the processing unit (processor). For a function of a specific unit, refer to the corresponding method embodiments. The sending unit and the receiving unit may form a transceiver unit, and a transmitter and a receiver may form a transceiver, to jointly implement receiving and sending functions. There may be one or more processors.

It should be understood that division of the foregoing units is merely function division, and there may be another division method during actual implementation.

The terminal device or the network device may be a chip, and the processing unit may be implemented by hardware or software. When being implemented by the hardware, the processing unit may be a logic circuit, an integrated circuit, or the like. When being implemented by the software, the processing unit may be a general-purpose processor, and is implemented by reading software code stored in a storage unit. The storage unit may be integrated into the processor, or may be located outside the processor and exist independently.

Figure 19:
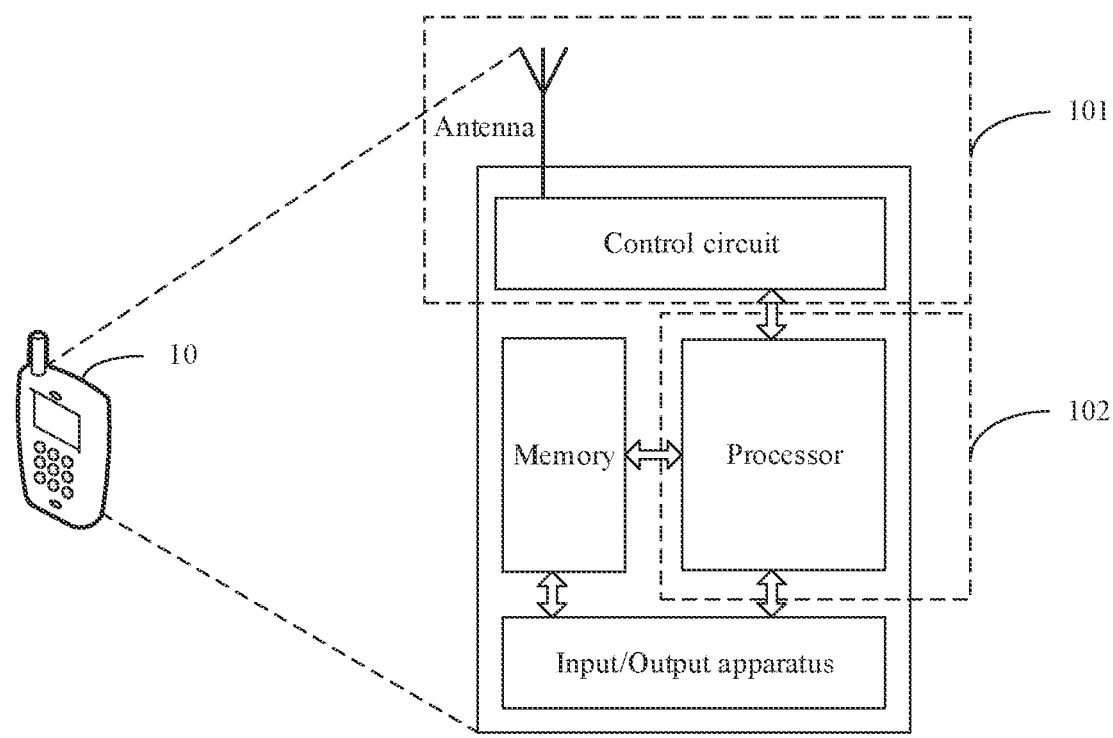
FIG. 19 is a schematic structural diagram of a terminal device according to an embodiment of this application.

FIG. 19 is a schematic structural diagram of a terminal device 10 according to this application. For ease of description, FIG. 19 shows only main components of the terminal device. As shown in FIG. 19, the terminal device 10 includes a processor, a memory, a control circuit, an antenna, and an input/output apparatus.

The processor is mainly configured to: process a communication protocol and communication data; control the entire terminal device; execute a software program; and process data of the software program. For example, the processor is configured to support the terminal device in performing an action described in the embodiments of the foregoing signal transmission methods. The memory is mainly configured to store a software program and data. The control circuit is mainly configured to: perform conversion between a baseband signal and a radio frequency signal, and process the radio frequency signal. A combination of the control circuit and the antenna may also be referred to as a transceiver that is mainly configured to transmit and receive a radio frequency signal in a form of an electromagnetic wave. The input/output apparatus, such as a touchscreen, a display screen, or a keyboard, is mainly configured to receive data input by a user and output data to the user.

After the terminal device is powered on, the processor may read the software program in a storage unit, explain and execute an instruction of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside through the antenna in a form of an electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 19 shows only one memory and one processor. An actual terminal device may have a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. Functions of the baseband processor and the central processing unit are integrated into the processor in FIG. 19. A person skilled in the art may understand that the baseband processor and the central processing unit each may be an independent processor, and are interconnected by using technologies such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

For example, in this embodiment of this application, the antenna and the control circuit that have receiving and sending functions may be considered as a transceiver unit 101 of the terminal device 10, and the processor having a processing function may be considered as a processing unit 102 of the terminal device 10. As shown in FIG. 19, the terminal device 10 includes the transceiver unit 101 and the processing unit 102. The transceiver unit may also be referred to as a transceiver, a transceiver machine, a transceiver apparatus, or the like. Optionally, a component that is in the transceiver unit 101 and that is configured to implement a receiving function may be considered as a receiving unit, and a component that is in the transceiver unit 101 and that is configured to implement a sending function may be considered as a sending unit. In other words, the transceiver unit 101 includes the receiving unit and the sending unit. For example, the receiving unit may also be referred to as a receiver, a receiver machine, a receive circuit, or the like, and the sending unit may be referred to as a transmitter, a transmitter machine, a transmit circuit, or the like.

The terminal device 10 shown in FIG. 19 can implement processes related to the terminal device in the method embodiments of FIG. 2 to FIG. 9B and of FIG. 12. The operations and/or the functions of the modules in the terminal device 10 are intended to implement corresponding procedures in the foregoing method embodiments. For details, refer to the descriptions in the foregoing method embodiments. To avoid repetition, detailed descriptions are properly omitted herein.

Figure 20:
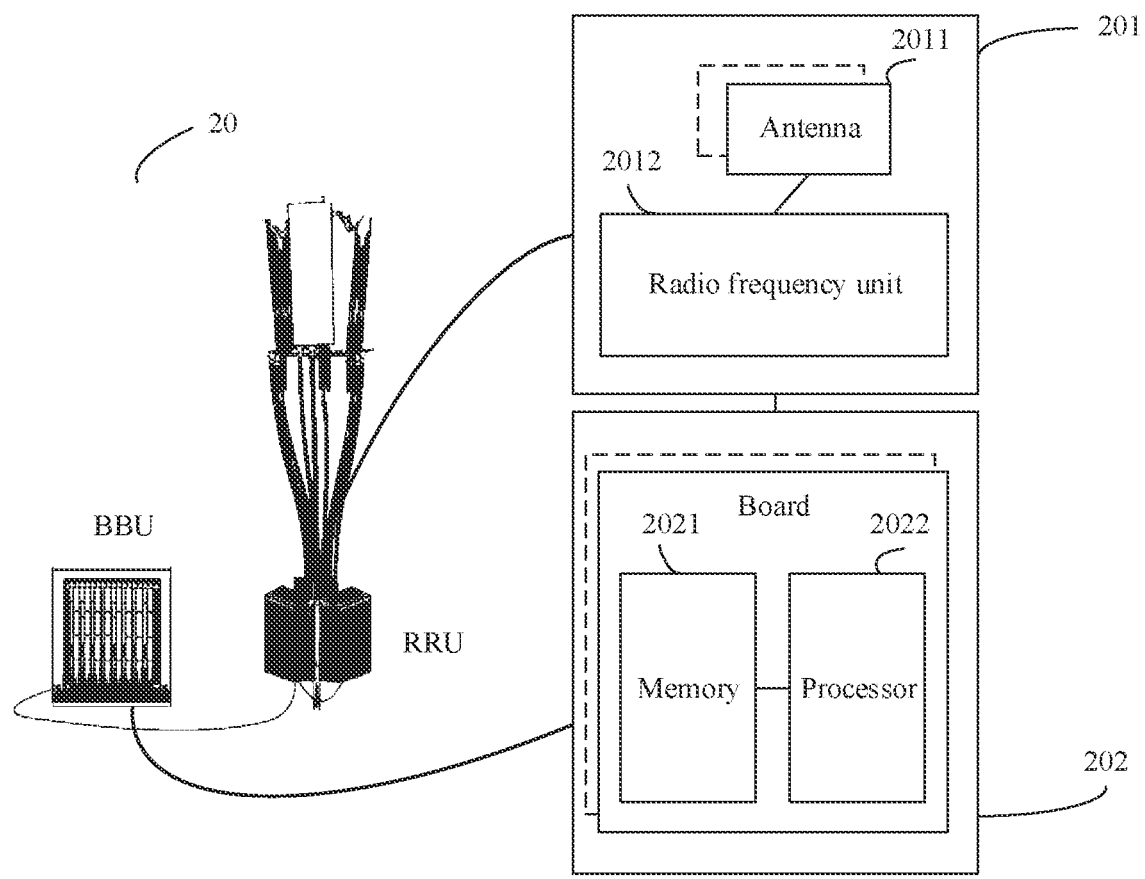
FIG. 20 is a schematic structural diagram of a network device according to an embodiment of this application.

FIG. 20 is a schematic structural diagram of a network device according to an embodiment of this application, for example, may be a schematic structural diagram of a base station. As shown in FIG. 20, the network device 20 may be used in the system shown in FIG. 1, and perform a function of the network device in the foregoing method embodiments.

The network device may be used in the communications system shown in FIG. 1, and perform a function of the network device in the foregoing method embodiments. The base station 20 may include one or more radio frequency units, such as a remote radio unit (RRU) 201 and one or more baseband units (BBU) (which may also be referred to as digital units (DU)) 202. The RRU 201 may be referred to as a transceiver unit, a transceiver machine, a transceiver circuit, a transceiver, or the like, and may include at least one antenna 2011 and a radio frequency unit 2012. The RRU 201 is mainly configured to perform receiving and sending of a radio frequency signal and conversion between a radio frequency signal and a baseband signal, for example, configured to send the PDCCH and/or the PDSCH in the foregoing method embodiments. The BBU 202 is mainly configured to: perform baseband processing, control the base station, and so on. The RRU 201 and the BBU 202 may be physically disposed together, or may be physically disposed separately, to be specific, may be distributed base stations.

The BBU 202 is a control center of the base station, may also be referred to as a processing unit, and is mainly configured to complete a baseband processing function such as channel coding, multiplexing, modulation, or spreading. For example, the BBU (the processing unit) 202 may be configured to control the base station to perform an operation procedure related to the network device in the method embodiments.

In an embodiment, the BBU 202 may include one or more boards. A plurality of boards may jointly support a radio access network (such as an LTE network) of a single access standard, or may separately support radio access networks (such as an LTE network, a 5G network, or another network) of different access standards. The BBU 202 further includes a memory 2021 and a processor 2022. The memory 2021 is configured to store a necessary instruction and necessary data. The processor 2022 is configured to control the base station to perform necessary actions. For example, the processor 2022 is configured to control the base station to perform an operation procedure related to the network device in the foregoing method embodiments. The memory 2021 and the processor 2022 may serve one or more boards. That is, a memory and a processor may be disposed on each board. Alternatively, a plurality of boards may share a same memory and a same processor. In addition, a necessary circuit may be further disposed on each board.

It should be understood that, the network device 20 shown in FIG. 20 can implement processes related to the network device in the method embodiments of FIG. 2 to FIG. 9B and of FIG. 12. The operations and/or the functions of the modules in the network device 20 are intended to implement corresponding procedures in the foregoing method embodiments. For details, refer to the descriptions in the foregoing method embodiments. To avoid repetition, detailed descriptions are properly omitted herein.

An embodiment of this application further provides a processing apparatus, including a processor and an interface. The processor is configured to perform the signal transmission method in any one of the foregoing method embodiments.

It should be understood that the processing apparatus may be a chip. For example, the processing apparatus may be a field programmable gate array (FPGA), an application-specific integrated chip (ASIC), a system on chip (SoC), a central processing unit (CPU), a network processor (NP), a digital signal processing circuit (DSP), a micro controller (MCU), a programmable controller (PLD), or another integrated chip.

In an implementation process, the steps in the foregoing methods may be completed by using a hardware integrated logic circuit in the processor or an instruction in a form of software. The steps in the methods disclosed with reference to the embodiments of this application may be directly performed and completed through a hardware processor, or may be performed and completed through a combination of hardware in a processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor. To avoid repetition, details are not described herein again.

It should be noted that the processor in the embodiments of this application may be an integrated circuit chip, and has a signal processing capability. In an implementation process, the steps in the foregoing method embodiments may be completed by using a hardware integrated logic circuit in the processor or an instruction in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, steps, and logical block diagrams that are disclosed in the embodiments of this application. The general-purpose processor may be a microprocessor, or the processor may be any conventional processor or the like. The steps in the methods disclosed with reference to the embodiments of this application may be directly performed and completed through a hardware decoding processor, or may be performed and completed through a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor.

It may be understood that, in the embodiments of this application, the memory may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. According to a description that is used by way of example, and not limitation, many forms of RAMs are available, for example, a static random access memory (static RAM, SRAM), a dynamic random access memory (dynamic RAM, DRAM), a synchronous dynamic random access memory (SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and the methods described in this specification aims to include but is not limited to these memories and any memory of another proper type.

An embodiment of this application further provides a communications system, including a transmit end device and a receive end device. For example, the transmit end device is a network device, and the receive end device is a terminal device; or the transmit end device is a terminal device, and the receive end device is a network device.

An embodiment of this application further provides a computer-readable medium. The computer-readable medium stores a computer program. When the computer program is executed by a computer, the signal transmission method in any one of the foregoing method embodiments is implemented.

An embodiment of this application further provides a computer program product. When the computer program product is executed by a computer, the signal transmission method in any one of the foregoing method embodiments is implemented.

An embodiment of this application further provides a system chip. The system chip includes a processing unit and a communications unit, where the processing unit may be, for example, a processor, and the communications unit may be, for example, an input/output interface, a pin, or a circuit. The processing unit may execute a computer instruction, so that the chip in the communications apparatus performs any signal transmission method provided in the foregoing embodiments of this application.

Optionally, the computer instruction is stored in a storage unit.

Optionally, the storage unit is a storage unit in the chip, for example, a register or a cache, or the storage unit may be a storage unit in a terminal but outside the chip, for example, a read-only memory (ROM) or another type of static storage device capable of storing static information and instructions, or a random access memory (RAM). The processor mentioned in any one of the foregoing designs may be a CPU, a microprocessor, an ASIC, or one or more integrated circuits used to control program execution of the signal transmission method. The processing unit and the storage unit may be decoupled, are separately disposed on different physical devices, and are connected in a wired or wireless manner to implement respective functions of the processing unit and the storage unit, to support the system chip in implementing various functions in the foregoing embodiments. Alternatively, the processing unit and the storage unit may be coupled to a same device.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer instructions are loaded or executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that the foregoing describes a communication method used in downlink transmission in a communications system. However, this application is not limited thereto. Optionally, a solution similar to the foregoing solution may also be used in uplink transmission. To avoid repetition, details are not described herein again.

The network device and the terminal device in the foregoing apparatus embodiments completely correspond to the network device and the terminal device in the method embodiments. A corresponding module or unit performs a corresponding step. For example, the sending module (transmitter) performs a sending step in the method embodiments, the receiving module (receiver) performs a receiving step in the method embodiments, and another step other than the sending step and the receiving step may be performed by the processing module (processor). For a function of a specific module, refer to the corresponding method embodiments. The sending module and the receiving module may form a transceiver module, and the transmitter and the receiver may form a transceiver, to jointly implement receiving and sending functions. There may be one or more processors.

In this application, "at least one" means one or more, and "a plurality of" means two or more. The term "and/or" describes an association relationship between associated objects and represents that three relationships may exist. For example. A and/or B may represent the following cases: Only A exists, both A and B exist, and only B exists, where A and B may be in a singular or plural form. The character "/" generally indicates an "or" relationship between the associated objects. "At least one of the following" or a similar expression thereof indicates any combination of the following, including any combination of one or more of the following. For example, at least one of a, b, or c may indicate: a, b, c, a-b, a-c, b-c, or a-b-c, where a, b, and c may be singular or plural.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" that appears throughout the entire specification does not necessarily mean a same embodiment. In addition, these particular features, structures, or characteristics may be combined in one or more embodiments in any proper manner. It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed by various computer-readable media that store various data structures. For example, the components may communicate by using a local and/or remote process and based on a signal having one or more data packets (for example, data from two components interacting with another component in a local system, a distributed system, and/or across a network such as the Internet interacting with another system by using the signal).

It should be understood that the term "and/or" in this specification describes only an association relationship for describing associated objects and represents that three relationships may exist. For example, A and/or B may represent the following three cases: Only A exists, both A and B exist, and only B exists.

A person of ordinary skill in the art may be aware that, in combination with illustrative logical blocks and steps described in the embodiments disclosed in this specification, this application may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may or may not be physical units, may be located at one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions (programs). When the computer program instructions (programs) are loaded or executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive solid state disk (SSD)), or the like.

The terms "uplink" and "downlink" in this application are used to describe data/information transmission directions in a specific scenario. For example, an "uplink" direction is usually a direction in which data/information is transmitted from a terminal to a network side, or a direction in which data/information is transmitted from a distributed unit to a central unit, and a "downlink" direction is usually a direction in which data/information is transmitted from a network side to a terminal, or a direction in which data/information is transmitted from a central unit to a distributed unit. It may be understood that the "uplink" and the "downlink" are only used to describe transmission directions of data/information, and neither a specific device from which data/information transmission starts nor a specific device at which data/information transmission stops is limited.

Names may be assigned to various objects that may appear in this application, such as various messages/information/devices/network elements/systems/apparatusesactions/operations/procedures/concepts. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

A person of ordinary skill in the art may be aware that, in combination with units and algorithm steps of the examples described in the embodiments disclosed in this application, this application can be implemented by electronic hardware or a combination of electronic hardware and computer software. Whether the functions are performed by hardware or software depends on particular applications and design constraints of the technical solutions. A person skilled in the art may use different methods to implement the described functions for each particular application, but it should not be considered that the implementation goes beyond the scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal reception method, comprising:
receiving first configuration information from a network device, wherein the first configuration information comprises a plurality of transmission configuration indicator (TCI) states of a physical downlink shared channel (PDSCH) and a configuration of a tracking reference signal (TRS) of the PDSCH, and the TRS comprises a plurality of channel state information reference signal (CSI-RS) resources;
receiving an activation command from the network device, wherein the activation command is used to activate one or more TCI states of the plurality of TCI states comprised in the received first configuration information;
determining a quasi-colocation (QCL) parameter of the PDSCH based on a first TCI state, wherein the first TCI state is a TCI state with a relatively smallest TCI state number in the one or more activated TCI states; and
receiving the PDSCH based on the QCL parameter of the PDSCH.

2. The method according to claim 1, wherein the QCL parameter includes information about a receive beam of the PDSCH.

3. The method according to claim 2, wherein a beam corresponding to the first TCI state is used as a default transmit beam of a sounding reference signal (SRS).

4. The method according to claim 1, wherein the QCL parameter of the PDSCH is determined based on a first CSI-RS resource in the plurality of CSI-RS resources and the first TCI state in the plurality of TCI states.

5. The method according to claim 1, wherein the first configuration information comprises configurations of a plurality of tracking reference signals (TRSs), and each TRS comprises a field indicating that the TRS is an activated TRS.

6. A communications apparatus, comprising:
a transceiver, configured to:
receive first configuration information from a network device, wherein the first configuration information comprises a plurality of transmission configuration indicator (TCI) states of a physical downlink shared channel (PDSCH) and a configuration of a tracking reference signal (TRS) of the PDSCH, and the TRS comprises a plurality of channel state information reference signal (CSI-RS) resources; and
receive an activation command from the network device, wherein the activation command is used to activate one or more TCI states of the plurality of TCI states comprised in the received first configuration information; and
at least one processor, configured to determine a quasi-colocation (QCL) parameter of the PDSCH based on a first TCI state, wherein the first TCI state is a TCI state with a relatively smallest TCI state number in the one or more activated TCI states, and wherein
the transceiver is further configured to receive the PDSCH based on the QCL parameter of the PDSCH.

7. The apparatus according to claim 6, wherein the QCL parameter includes information about a receive beam of the PDSCH.

8. The apparatus according to claim 7, wherein a beam corresponding to the first TCI state is used as a default transmit beam of a sounding reference signal (SRS).

9. The apparatus according to claim 6, wherein the QCL parameter of the PDSCH is determined based on a first CSI-RS resource in the plurality of CSI-RS resources and the first TCI state in the plurality of TCI states.

10. The apparatus according to claim 6, wherein the first configuration information comprises configurations of a plurality of tracking reference signals (TRSs), and each TRS comprises a field indicating that the TRS is an activated TRS.

11. A signal transmission method, comprising:
sending first configuration information to a terminal device, wherein the first configuration information comprises a plurality of transmission configuration indicator (TCI) states of a physical downlink shared channel (PDSCH) and a configuration of a tracking reference signal (TRS) of the PDSCH, and the TRS comprises a plurality of channel state information reference signal (CSI-RS) resources;
sending an activation command to the terminal device, wherein the activation command is used to activate one or more TCI states of the plurality of TCI states comprised in the sent first configuration information, wherein the first configuration information is used to enable the terminal device to determine a quasi-colocation (QCL) parameter of the PDSCH based on a first TCI state, and wherein the first TCI state is a TCI state with a relatively smallest TCI state number in the one or more activated TCI states; and
sending signals on the PDSCH by using a transmit beam of the PDSCH.

12. The method according to claim 11, wherein the QCL parameter includes information about a receive beam to be used by the terminal device for receiving the signals on the PDSCH.

13. The method according to claim 12, wherein a beam corresponding to the first TCI state is used as a default transmit beam of a sounding reference signal (SRS).

14. The method according to claim 11, wherein the QCL parameter of the PDSCH is determined based on a first CSI-RS resource in the plurality of CSI-RS resources and the first TCI state in the plurality of TCI states.

15. The method according to claim 11, wherein the first configuration information comprises configurations of a plurality of tracking reference signals (TRSs), and each TRS comprises a field indicating that the TRS is an activated TRS.

16. A communications apparatus, comprising:
a transceiver, configured to:
send first configuration information to a terminal device, wherein the first configuration information comprises a plurality of transmission configuration indicator (TCI) states of a physical downlink shared channel (PDSCH) and a configuration of a tracking reference signal (TRS) of the PDSCH, and the TRS comprises a plurality of channel state information reference signal (CSI-RS) resources;
send an activation command to the terminal device, wherein the activation command is used to activate one or more TCI states of the plurality of TCI states comprised in the sent first configuration information, wherein the first configuration information is used to enable the terminal device to determine a quasi-colocation (QCL) parameter of the PDSCH based on a first TCI state, and wherein the first TCI state is a TCI state with a relatively smallest TCI state number in the one or more activated TCI states; and
send signals on the PDSCH by using a transmit beam of the PDSCH.

17. The apparatus according to claim 16, wherein the QCL parameter includes information about a receive beam to be used by the terminal device for receiving the signals on the PDSCH.

18. The apparatus according to claim 17, wherein a beam corresponding to the first TCI state is used as a default transmit beam of a sounding reference signal (SRS).

19. The apparatus according to claim 16, wherein the QCL parameter of the PDSCH is determined based on a first CSI-RS resource in the plurality of CSI-RS resources and the first TCI state in the plurality of TCI states.

20. The apparatus according to claim 16, wherein the first configuration information comprises configurations of a plurality of tracking reference signals (TRSs), and each TRS comprises a field indicating that the TRS is an activated TRS.

* * * * *